US008561902B2

(12) United States Patent
McQueen et al.

(10) Patent No.: US 8,561,902 B2
(45) Date of Patent: *Oct. 22, 2013

(54) SYSTEMS AND METHODS FOR WEIGH SCALE PERIMETER MONITORING FOR SCANNER-SCALES

(75) Inventors: Alexander M. McQueen, Eugene, OR (US); Patrick M. O'Donnell, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/153,281

(22) Filed: Jun. 3, 2011

(65) Prior Publication Data

US 2011/0232972 A1   Sep. 29, 2011

Related U.S. Application Data

(63) Continuation-in-part of application No. 12/956,716, filed on Nov. 30, 2010.

(60) Provisional application No. 61/267,376, filed on Dec. 7, 2009.

(51) Int. Cl.
G06K 7/10 (2006.01)

(52) U.S. Cl.
USPC .......... 235/454; 235/375; 235/383; 235/385; 235/462.08; 235/462.43

(58) Field of Classification Search
USPC ........ 235/454, 375, 383, 385, 462.08, 462.43
See application file for complete search history.

(56) References Cited

U.S. PATENT DOCUMENTS

| 4,000,397 A | 12/1976 | Hebert et al. |
| 4,716,281 A | 12/1987 | Amacher et al. |
| 4,881,606 A | 11/1989 | Halfon et al. |
| 5,058,691 A | 10/1991 | Sela |

(Continued)

FOREIGN PATENT DOCUMENTS

| EP | 0967 565 A2 | 12/1999 |
| EP | 1039 275 A1 | 9/2000 |

(Continued)

OTHER PUBLICATIONS

Perkin Elmer Technical Note TN1000, "What is a Lock-in Amplifier?", 2000, 4 pages.

(Continued)

Primary Examiner — Allyson Trail
(74) Attorney, Agent, or Firm — Stoel Rives LLP

(57) ABSTRACT

Systems and methods for reducing erroneous weighing of items such as by detecting items extending beyond a periphery of a weigh platter whereby in one configuration, the system employs a light guide for routing a light beam to a detector operative to detect interruption of the beam due to an item encroaching upon or overhanging an edge of the platter. In another configuration, the scale includes a perimeter gap between the platter outer edge and scanner housing frame or checkout counter, a light beam directed angularly upward through the gap is partially obstructed by the frame and platter whereby light exits the gap forming a light plane, wherein an object placed on the platter extending across the gap intersects the light plane thus scattering light rays, some of which are sensed by a detector. Various indicators for alerting the operator of off-scale detection are also described.

20 Claims, 16 Drawing Sheets

(56) References Cited

U.S. PATENT DOCUMENTS

| | | |
|---|---|---|
| 5,143,164 A | 9/1992 | Nahar |
| 5,260,554 A | 11/1993 | Grodevant |
| 5,367,291 A | 11/1994 | Fockens |
| 5,410,108 A | 4/1995 | Williams et al. |
| 5,446,271 A | 8/1995 | Cherry et al. |
| 5,463,211 A | 10/1995 | Arends et al. |
| 5,747,744 A | 5/1998 | Kraft et al. |
| 6,080,938 A | 6/2000 | Lutz |
| 6,085,979 A | 7/2000 | Maddox |
| 6,092,838 A * | 7/2000 | Walker .......................... 280/735 |
| 6,237,852 B1 | 5/2001 | Svetal et al. |
| 6,297,750 B1 | 10/2001 | Wingate et al. |
| 6,330,973 B1 | 12/2001 | Bridgall et al. |
| 6,332,575 B1 | 12/2001 | Schuessler et al. |
| 6,354,498 B1 * | 3/2002 | Lutz ............................... 235/385 |
| 6,416,183 B1 * | 7/2002 | Colpaert et al. ................ 353/46 |
| 6,547,040 B2 | 4/2003 | Goodwin, III |
| 6,707,381 B1 | 3/2004 | Maloney |
| 7,050,043 B2 | 5/2006 | Huang et al. |
| RE40,071 E | 2/2008 | Svetal et al. |
| 7,347,367 B2 | 3/2008 | White |
| 2004/0035928 A1 * | 2/2004 | Anderson ..................... 235/385 |
| 2005/0103850 A1 * | 5/2005 | Mergenthaler et al. .. 235/462.08 |
| 2007/0102513 A1 | 5/2007 | Scheb |
| 2008/0169347 A1 | 7/2008 | Olmstead |
| 2008/0255790 A1 | 10/2008 | Roquemore et al. |
| 2010/0139989 A1 | 6/2010 | Atwater et al. |
| 2011/0121950 A1 * | 5/2011 | Izadi et al. ................... 340/10.5 |
| 2011/0132985 A1 | 6/2011 | McQueen et al. |
| 2011/0163996 A1 | 7/2011 | Wassvik et al. |

FOREIGN PATENT DOCUMENTS

| | | |
|---|---|---|
| JP | 11-203385 A | 7/1999 |
| JP | 2000-028424 | 1/2000 |
| JP | 2006-154738 A | 6/2006 |
| JP | 2008-524587 | 7/2008 |
| KR | 10-2011-0039282 A | 4/2011 |
| WO | WO 02/33647 A1 | 4/2002 |
| WO | WO 2005-038506 A1 | 4/2005 |

OTHER PUBLICATIONS

International Searching Authority, International Patent Application No. PCT/US2010/058604, International Search Report and Written Opinion, Jul. 22, 2011, 9 pages.

Items from the prosecution of U.S. Appl. No. 12/956,716 (the parent to the present application: (1)Office Action dated Sep. 12, 2012; (2) Response to Office Action filed Dec. 12, 2012.

Written Opinion and International Search Report, PCT/US2012/040605, Jan. 30, 2013. (PCT application corresponds to the present application).

McQueen et al., U.S. Appl. No. 12/956,716, and Item(s) from prosecution: Office Action, Mar. 26, 2013.

Atwater et al., U.S. Appl. No. 12/634,252, and Item(s) from prosecution: Jan. 28, 2013 Office Action.

* cited by examiner

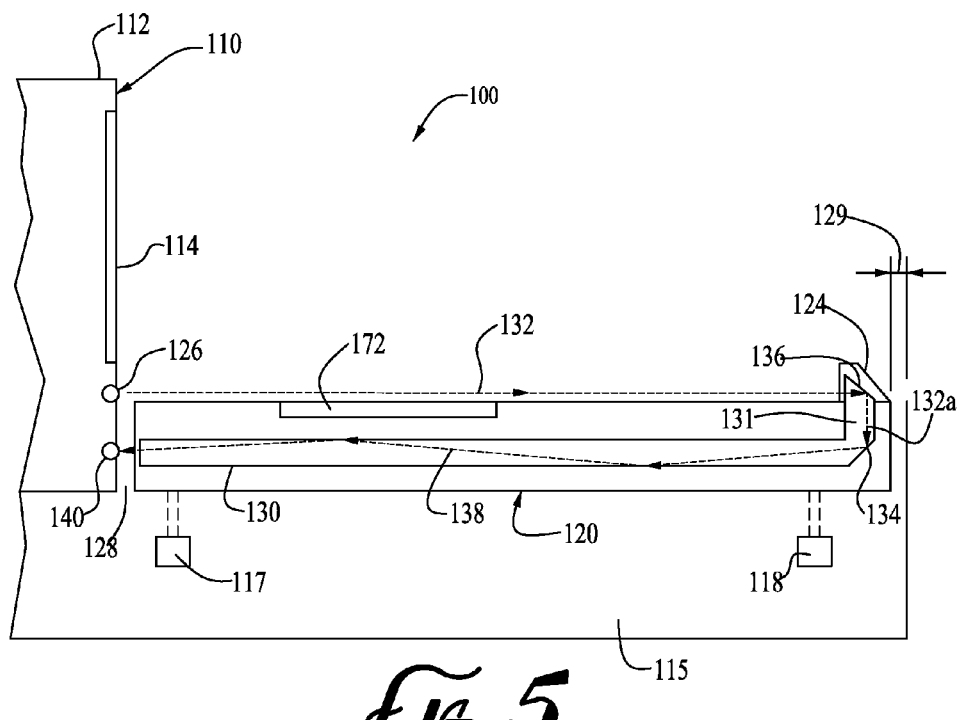
fig.5
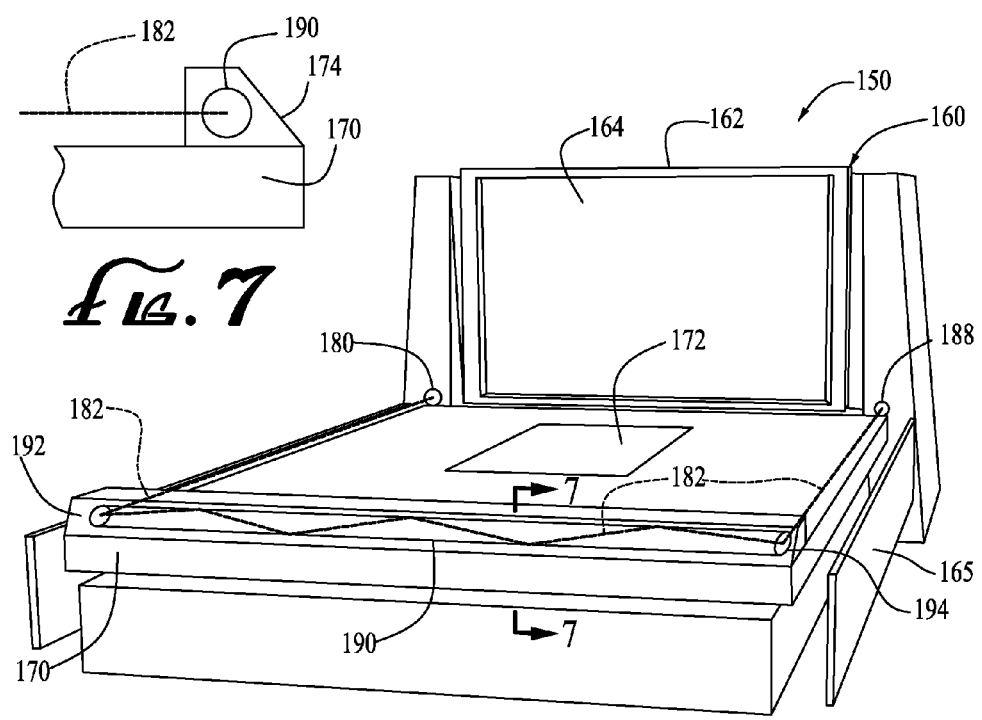
fig.7
fig.6

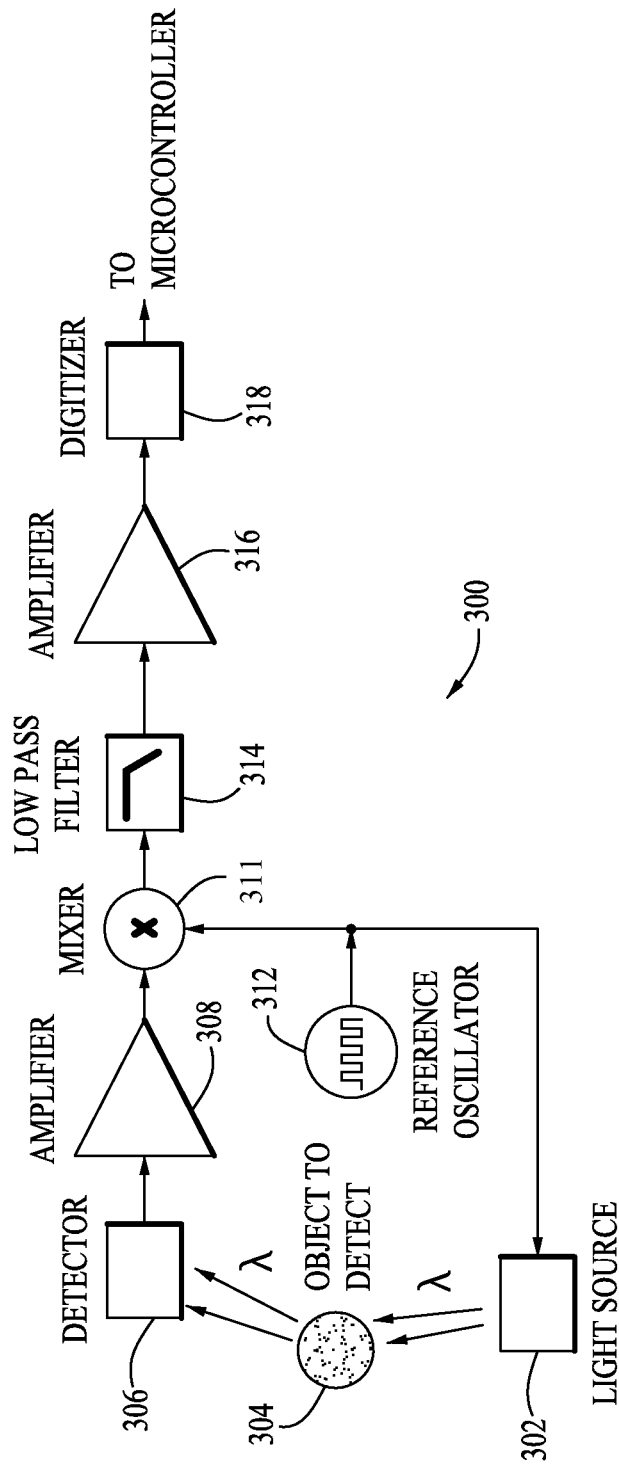

SYSTEMS AND METHODS FOR WEIGH SCALE PERIMETER MONITORING FOR SCANNER-SCALES

RELATED APPLICATION DATA

This application is a continuation-in-part of U.S. application Ser. No. 12/956,716 filed Nov. 30, 2010, which claims priority to U.S. provisional application No. 61/267,376 filed Dec. 7, 2009, each of these application hereby incorporated by reference.

BACKGROUND

Field of present disclosure relates to scales and other weighing devices such as those, for example, located at and combined with a data reader device into a scanner-scale system.

Data readers such as bar code scanners typically include a scale apparatus for measuring weights of produce and other items sold by weight. The scale apparatus typically has a load cell and a weigh platter which rests on the load cell. The weigh platter is typically flush mounted with the top surface of a checkout counter. Such a flush mounted weigh platter exposes the scale to inaccurate weighing when articles placed on the scale extend beyond the perimeter of the scale surface and onto the checkout counter. In such a situation, where the item comes to rest partly on the top surface of the checkout counter the scale would record a weight less than the actual weight of the item, namely a lower weight than the item actually weighs resulting in a loss of revenue for the retailer due to this inaccurate weighing.

Several off scale item sensing devices have been proposed. One such system includes a light source that generates a light beam and a plurality of mirrors directing the light beam along a path around a perimeter of the weigh platter and then to a detector. The detector receives the light beam and an alarm coupled to the detector is operative for alerting an operator when the item is placed in the light beam path. Such a system requires system components be positioned above the surface of the weigh platter. These components tend to require precise optical alignment and/or placement and are subject to impact of items being passed through the scan volume interfering with the movement of items and impact may also cause misalignment of the components. Present inventors have thus recognized the need for an improved system for detecting off scale items.

SUMMARY

The present disclosure is directed to systems and methods for reducing or otherwise mitigating erroneous weighing of items such as, for example, by detecting items extending beyond or encroaching upon a periphery of a scale and thus potentially contacting the fixed frame of the housing or the checkout counter surface resulting in inaccurate weighing. In a first preferred configuration, the system includes a light source disposed in or on a housing of a scanner-scale for producing a light beam along an edge of the weigh platter, a detector for receiving the light beam, the detector disposed in or on the housing, and a light guide disposed in the weigh platter for routing the light beam to the detector, wherein the detector is operative for detecting an interruption of the light beam due to an item encroaching upon or overhanging an edge of the weigh platter.

In a second preferred configuration, also described with respect to a scanner-scale, the scale portion is formed with a perimeter gap between the weigh platter outer edge and a scanner housing frame (or the checkout counter if the scanner-scale does not include such a frame). Light sources, which are highly divergent, are pointed upward at an angle towards the gap, the light producing fan shaped beams which are partially obstructed by the perimeter frame and weigh platter. The portion of light beams which do not strike any objects crossing the gap form essentially planes of light exiting the air gap in the substantially vertical direction, this plane of light may be referred to as a light curtain. When an object placed on the weigh platter such that a portion of it extends across the air gap, some of the light rays propagating up and out of the gap strike the object scattering light rays, some of which are sensed by the detector with the system then alerting the operator of the off scale item.

BRIEF DESCRIPTION OF THE DRAWINGS

FIG. 5 is a diagrammatic side view of an off-scale detection system of an alternate configuration.

FIG. 6 is a diagrammatic front right side perspective view of another alternate configuration.

FIG. 7 is a cross section of FIG. 6 along line 7-7.

FIG. 12 is a diagram of a lock-in detection system according to a one embodiment.

DETAILED DESCRIPTION OF THE PREFERRED EMBODIMENTS

Figure 1:
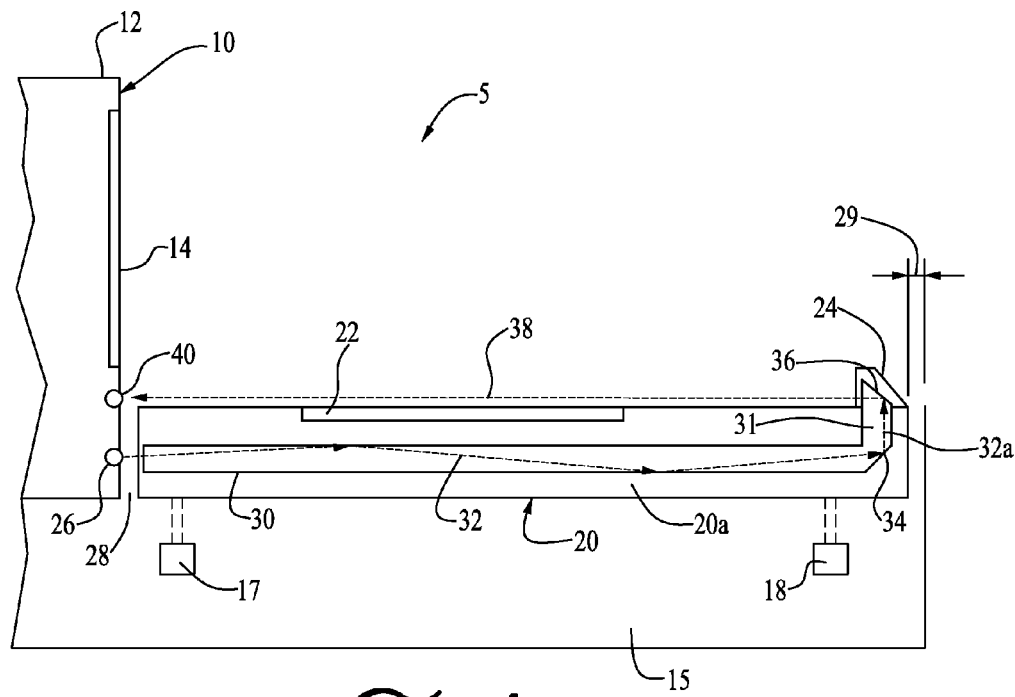
FIG. 1 is a diagrammatic side view an off-scale detection system according to a first embodiment.

Preferred embodiments will now be described with reference to the drawings. For clarity of description, the reference numeral representing an element in one figure will refer to the same element in any other figure.

Figure 2:
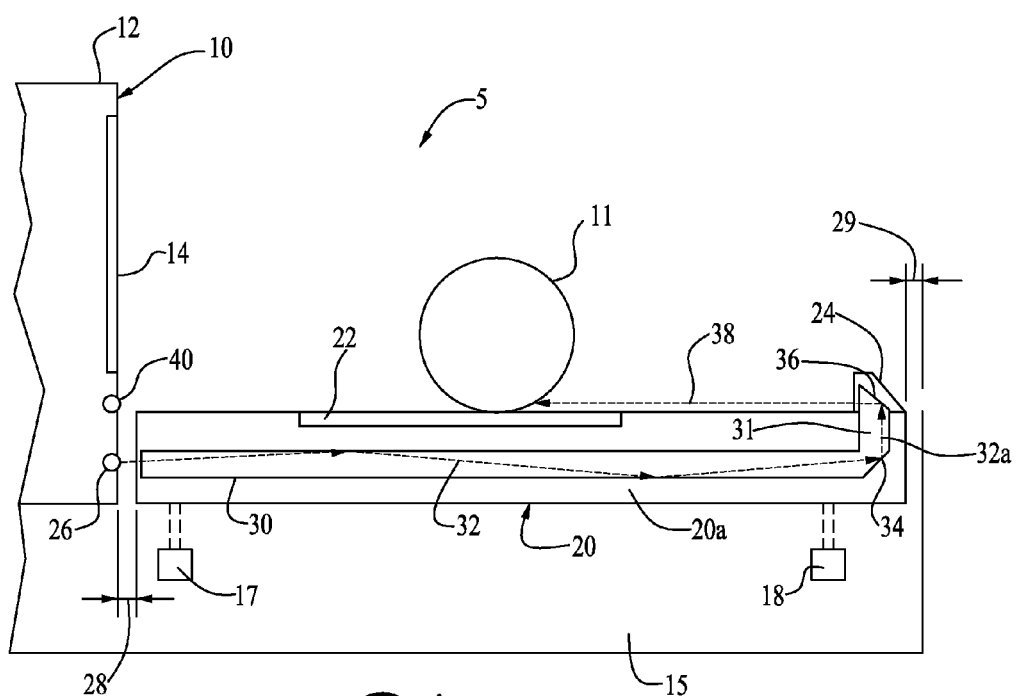
FIG. 2 is a diagrammatic side view of the system of FIG. 1 further illustrating an object being detected.

FIGS. 1-2 illustrate an off-scale detection system 5 according to a first embodiment. Though example systems are described in a multi-plane scanner-scale, the system may be used in other scale systems such as the single window scanner-scale, a scanner-scale with either vertical or horizontal window, or in a scale system wherein the scale is separate from the scanner. Moreover, the scanner may comprise a laser-based scanner, an imaging-based scanner, an RFID reader, or any suitable reading device.

In the illustrated embodiment of FIGS. 1-2, the off-scale system 5 is applied to a scanner-scale 10 having a lower housing section 15 and an upper housing section 12. The scanner-scale 10 includes a weigh platter 20 suspended via a suitable mechanism onto one or more load cell(s) 17, 18. The weigh platter 20 is separated from the upper housing section 12 by a gap 28 and is separated from the lower housing section 15 by gap 29 so as not to contact the stationary sections of the scanner housing. The scanner has an upper/vertical window 14 disposed in the upper housing section 12 and a horizontal window 22 disposed in the weigh platter 20 of the lower housing section 15.

A light source 26 is installed in the housing proximate the weigh platter 20 and below the plane of the horizontal platter 20. A light guide 30 is disposed in the weigh platter along a side edge thereof, the light guide extending from the head edge of the platter proximate the light source 26 to the foot 24 of the platter. The light guide 30 is attached to the weigh platter 20 and moves freely with it. Light 32 projected from the light source 26 passes through the air gap 28 and enters the light guide 30 thus avoiding any mechanical connection between the housing containing the light source and the weigh platter 20. The light 32 enters and travels within the light guide 30 and upon reaching the foot of the platter is reflected upward via a reflecting feature 34, the light traveling in an upward path 32a within a vertical light pipe section 31 and is then reflected in a reverse direction via reflecting feature 36 along a return path 38 toward the detector 40 disposed on the vertical housing section 12. The reflecting features 34, 36 may comprise reflecting mirrors or may be merely angled or curved sections of the light guide 30.

The light guide 30 may comprise a light pipe. A light pipe is a transparent material that usually is drawn or otherwise formed into an elongated shape (for example, cylindrical, pyramidical or conical, and may have a round or rectangular cross-section) through which light is channeled from one end to the other by total internal reflections. In some cases, the light pipe may include a tapering of its cross-sectional size from one end to the other. One example of a light pipe is an optical fiber. The light pipe 30 may be formed to include a separate lens or lens function to shape the light beam 32 and/or 38. Additional field-of-view controls may be provided for the detector such as baffles, apertures, lenses or combinations thereof. The light source 26 may be provided with suitable focusing optics. The light beam 32 may be generated in any suitable wavelength, but is preferably in the non-visible range of near-infrared.

Light from the light source 26 thus travels from the source, through the light pipe 30 reflecting off the pipe sides (as shown by path 32), up through pipe section 31 and along return path 38 to detector 40. Though the light is contained via the light pipe, once it leaves the light pipe, the light will fan out and dissipate more rapidly. FIG. 2 illustrates an item 11 positioned partly on the platter but extending off the platter and onto the counter. When an item 11 is positioned in the light path 38, light from the light source 26 is partially blocked from reaching the detector 40 and from the change in light reaching the detector 40 it is inferred (via operation of a suitable controller operatively connected to the detector) that the item may be "off-scale" and an alarm, audio or visual, is actuated notifying the operator that the item may indeed be off-scale and in contact with the counter potentially resulting in an inaccurate weighing.

Preferably, a duplicate set of system parts is disposed on the other side of the platter 20.

Checkout scanners generally employ audible signals for notifying the operator of various events. The most common signal is the "beep" tone indicating that a bar code on an item has been successfully read by the scanner. In the typical grocery store environment there are multiple scanners in operation, each one of them beeping when reading items, and there are other ambient noises as well. A scanner also has certain visual indicators, in a typical two-plane scanner, light indicators are disposed on the upper housing section. It is desirable to have the indicators for the protected scale edges somewhat proximate to the area that is protected so that it is obvious what the function of the indicators is, in accordance with good human factors design. However, if the indicators are placed low on the vertical housing, for example, near to the scale edges, the operator's view of these indicators will be blocked by large items on the platter. The system 5a of FIGS. 3-4 offers an alternative solution to this problem.

Figure 3:
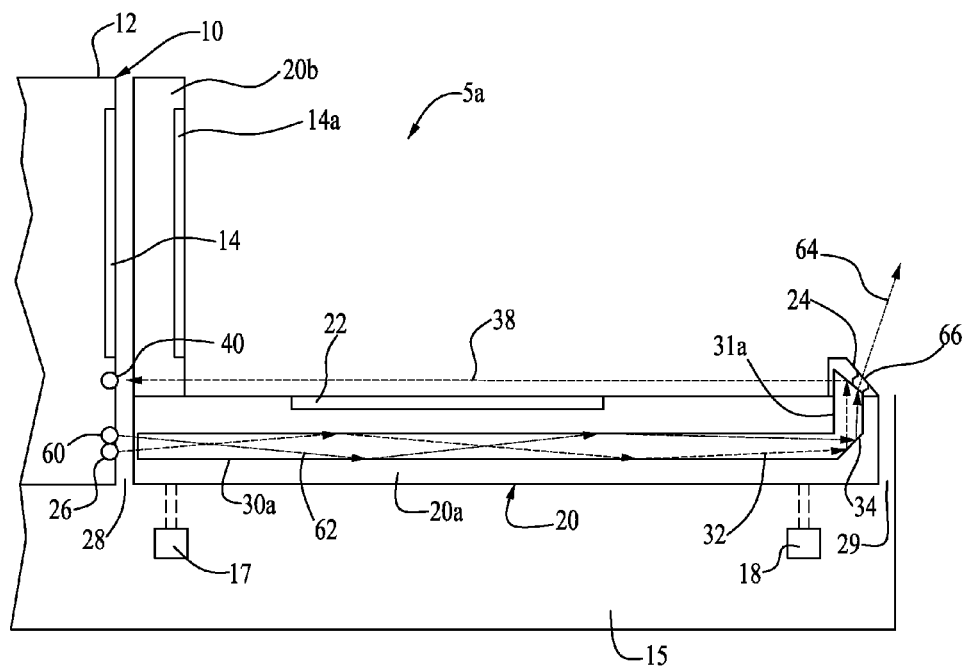
FIG. 3 is a diagrammatic side view of the system of FIGS. 1-2 further including an indicator.
Figure 4:
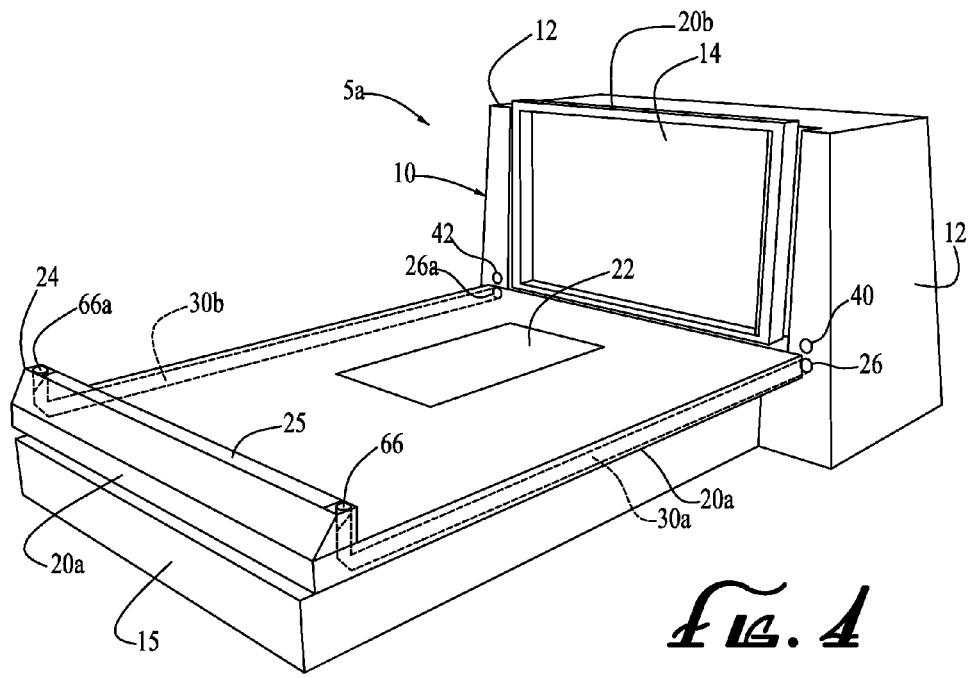
FIG. 4 is a diagrammatic front right side perspective view of the system of FIG. 3.

FIGS. 3-4 illustrate an alternate off-scale detection system 5a that is substantially the same as the prior-described system 5 of FIGS. 1-2 except that the system includes a visual indicator feature and the system is installed on a scanner-scale 10 with two-plane weigh scale 20, the weigh scale having a lower (horizontal) section 20a and an upper (vertical) section 20b. The horizontal section 20a contains the horizontal window 22 and the vertical section 20b contains the vertical window 14a. The scanner housing 10 has a lower housing section 15 and an upper housing section 12. The scanner has an upper/vertical window 14 disposed in the upper housing section 12. The weigh platter 20 is suspended via a suitable mechanism onto one or more load cell(s) 17, 18. So as not to contact the stationary sections of the scanner housing, the weigh platter 20 is separated from the upper housing section 12 by a gap 28; is separated from the lower housing section 15 by gap 29; and is separated from side frame members by suitable gaps (similar to gaps 252, 257 in FIG. 8 below).

The light source 26, light guide 30a and detector 40 are of similar configuration as in the prior embodiment. In the system 5a, instead of just one light source 26, another light source 60 has been added. Preferably, the light source 26 associated with the platter perimeter protection beam 32 is a near-infrared (NIR) LED which is invisible to the human eye. The perimeter protection beam 32 travels the same path as described for the prior embodiment of FIGS. 1-2. The second source 60 produces a visible beam of some suitable color, such as green. The light guide 30a in FIGS. 3-4 has an additional feature 66 (such as an opening or a transparent section) which leaks some of the light out of the guide 30a and redirects it towards the operator. This system/method creates illuminated indicators on the weigh platter at the end nearest the operator, so they may be easily seen. When the sensing beam 38 is interrupted by an object and an alarm condition exists, the green light source 60 is turned off by the system, and the green indicating light 64 vanishes, alerting the operator to a problem.

In an alternate configuration, the source 60 may be a multicolor LED which can indicate conditions by green and red, rather than just green and off. For example in the normal operating condition the LED emits a green color indicating to the operator that the weighing condition is satisfactory, but when an off-scale object is detected, the LED emits the color red thereby alerting the operator of the off-scale condition. Other color indication schemes and flashing lights may be implemented.

In another embodiment, the indicating source 60 and sensing source 26 may be combined into one LED. The sensing may be accomplished by modulating the visible indicating source at a frequency higher than perceptible by humans. In another embodiment, the detection light 32/38 and/or the indication light 62 may be synchronized with the scanning device to avoid "blinding" the scanner with extraneous light.

In the embodiments of FIGS. 1-4, the foot section 24 is shown extending across an entire width of the platter 20, and includes a central portion 25 (see FIG. 4). Alternately, the platter foot central portion 25 may be omitted, with the light guides 30a, 30b extending into small protrusions disposed just at the corners of the foot of the platter 20. As a result, in that configuration the central portion of the platter 20 between those corner protrusions would be level/continuous with the surface of the rest of the platter.

Preferably the weigh platter comprises a two plane weigh platter having a lower platter section containing the horizontal window 22 and an upper platter section 20b containing an upper window 14a as illustrated in FIGS. 3-4. One such two plane weigh system is the All-Weighs® platter system available from Datalogic Scanning, Inc. of Eugene, Oreg., further described in U.S. Pat. No. RE40,071 hereby incorporated by reference. FIG. 4 illustrates both sides of the platter 20 including a light guide 30a and detectors 40. The weigh platter includes a foot rail 24, a raised section of the weigh platter at the foot thereof designed to inhibit items from extending off the platter yet not inhibit passing items along the counter laterally across the scanner-scale. The light pipes 30a, 30b (shown in dashed lines) and the indicators 66, 66a are shown disposed at the ends of the foot rail 24.

The system may include software that takes feedback/control signals not only from the detector but also from the Point of Sale system (POS) and/or the weigh scale. Typically, the POS has a weighing function that requires the operator to key in a code for an item, such as fresh produce, that is sold by weight. The off-scale detection system may normally be in an "off" or dormant state, but is activated by various activities, such as (1) being alerted by the POS that a weighing activity is occurring, (2) the weigh scale detecting that an item is on the scale, the weigh scale detecting a mass on the scale that is not changing, meaning that the item is not being moved and must have been placed on the platter with the intent to weigh it. Weight detection (or completion of a successful weighing operation) of an item may be delayed (such as the scale being disabled) until the off-scale detection system determines that the item is not off-scale or the transmission of weight data to the host may be delayed until the off-scale detection system enables this action.

It may be desirable to keep the indicator(s) in an off state until it is determined that a weighing operation is occurring. Thus in one embodiment, the indicators are kept in the off state to keep the indicator(s) from flashing unnecessarily during scanning operations. During scanning, items being scanned may intermittently block the perimeter light beams, though this intermittent blocking may be of little or no consequence to the transaction until a weighing operation is being performed. Thus, inhibiting the indicator until a weighing operation is underway will avoid undue distraction to the operator.

One method to determine when a weighing operation is being performed is to determine that the scale is not in motion and that there is more than approximately zero weight on the scale. If items are being scanned, the scale would typically be in motion due to the movement of items being scanned/dragged across the scale, and the indicator(s) should be inhibited. Similarly, if the scale is not in motion, but there is approximately zero weight on the platter, then this zero weight condition with scale not in motion would indicate that there is no weighing taking place, and so again the indicator(s) should be inhibited.

For purposes of description, certain sides of the weigh platter will now be defined, in this case with respect to FIG. 4, but the terminology is applicable to each of the embodiments. The weigh platter 20a may be described as having a generally rectangular shape thus having four sides or edges defined as follows: (1) a proximal side edge is the edge nearest the scanner-scale's vertical section 12, the proximal side may also be described as the customer side; (2) a distal side edge is the furthest from the scanner-scale's vertical section 12 and thus next to the foot rail 24, the distal side may also be described as the checker side because it is the side normally nearest the checker or cashier in a typical installation; (3) a first or right lateral side edge is the lateral side nearest light pipe 30a; and (4) a second or left lateral side edge is the lateral side proximate light guide 30b.

FIG. 5 illustrates an off-scale detection system 100 according to another embodiment. The system 100 is similar to the prior system 5 of FIGS. 1-2 only the light source and detector locations are reversed. As in the prior embodiment, the off-scale system 100 is applied to a scanner-scale 110 having a lower housing section 115 and an upper housing section 112. The scanner-scale 110 includes a weigh platter 120 suspended via a suitable mechanism onto one or more load cell(s) 117, 118. The weigh platter 120 is separated from the upper housing section 112 by a gap 128 and is separated from the lower housing section 115 by gap 129 so as not to contact the stationary sections of the scanner housing. The scanner 110 has an upper/vertical window 114 disposed in the upper housing section 112 and a horizontal window 122 disposed in the weigh platter 120 of the lower housing section 115.

A light source 126 is installed in the housing proximate the weigh platter 120 and above the top surface plane of the horizontal platter 120. A light guide 130 is disposed in the weigh platter 120 along a side edge thereof, the light guide extending from the head edge of the platter proximate the vertical section 112 to the foot 124 of the platter 120. The light guide 130 is attached to the weigh platter 20 and moves freely with it. Light 132 projected from the light source 126 passes over the platter 120 and reaches an opening in the platter foot rail 124. The light 132 enters and travels within the light guide 130 and is reflected downward via a reflecting feature 136, the light traveling in a downward path 132a within a vertical light pipe section 131 and is then reflected in a reverse direction via reflecting feature 134 within light guide 130 along path 138 toward the detector 140. The reflecting features 134, 136 may comprise reflecting mirrors or may be merely curved sections of the light guide 130. At the end of the light guide 130, the light 138 passes out of the light guide 130 through the air gap 128 and onto the detector 140, thus avoiding any mechanical connection between the platter 120 and the housing containing the light source 126 and the detector 140.

The light guide 130 may comprise a light pipe as previously described. Additional field-of-view controls may be provided for the detector 140 such as baffles, apertures, lenses or combinations thereof. The light source 126 may be provided with suitable focusing optics.

As in the previous embodiments, when an item is positioned in the light path 132, the light beam from the light source 126 is interrupted or partially blocked from reaching the detector 140 and from the change in light reaching the detector 140 it is inferred that the item may be "off-scale" and an indicator, such as an alarm, audio or visual, is actuated notifying the operator that the item may indeed be off-scale and in contact with the counter potentially resulting in an inaccurate weighing.

Preferably, a duplicate set of system parts is disposed on the other side of the platter 120. The system 100 may include the indicator feature 66 of FIGS. 3-4, and the indicator light in either embodiment may be located next to the light source or the detector.

FIGS. 6-7 illustrate an off-scale detection system 150 according to yet another embodiment. The system 150 is similar to the prior system 5 of FIGS. 1-2 only the location of the light guide is changed. As in the prior embodiment, the off-scale system 150 is applied to a scanner-scale 160 having a lower housing section 165 and an upper housing section 162. The scanner-scale 160 includes a weigh platter 170 suspended via a suitable mechanism onto one or more load cell (in similar fashion as previous embodiments). The weigh platter 170 is separated from the upper housing section and lower housing sections so as not to contact the stationary sections of the scanner housing. The scanner-scale 160 has an upper/vertical window 164 disposed in the upper housing section 162 and a horizontal window 172 disposed in the weigh platter 170 of the lower housing section 165. The weigh platter 170 includes a foot rail 174 on the side of the platter opposite the vertical section 162.

A light source 180 is disposed in or on the upper housing section 162 at an elevation above the plane or top surface of the platter 170 directing a light beam 182 along a side edge of the platter 170. The light beam 182 is reflected by a mirror 192 or other reflective element and into a light guide 190 disposed within the foot rail 174. The light guide 190 serves to direct the light beam 182 to the other end of the foot rail 174 where another reflective element such as mirror 194 reflects the beam along the other edge of the platter 170 and toward the detector 188. Both the detector 188 and the light source 180 are preferably mounted on the vertical section 162 and not on the platter 170 thus eliminating any need for electrical connection onto the platter 170. The detector 188 detects an interruption of the light beam 182 that occurs if an item being weighed is off-platter at either edge. The light guide 190 serves to reduce precision needed for alignment of the light source 180, mirrors 192/194, and detector 188 and also reduces light intensity loss between mirrors 192 and 194. The mirrors 192 and 194 could also be incorporated into the light guide itself, similar to the reflectors 34 and 36 of FIG. 1.

The system 150 preferably includes a two-plane platter with the vertical window 164 disposed in a vertical portion of the platter 170 and the lower window 172 disposed in the horizontal portion of the platter. Items to be weighed are placed on the platter surface and the vertical window 164 being part of the platter keeps items from going off-scale in the direction toward the vertical section 162. The foot rail 174 acts as a raised-up portion to keep items from going off-scale on the distal checker side. The detection system light beam 182 serves to detect off scale items at either the left lateral side edge or the right lateral side edge.

Figure 8:
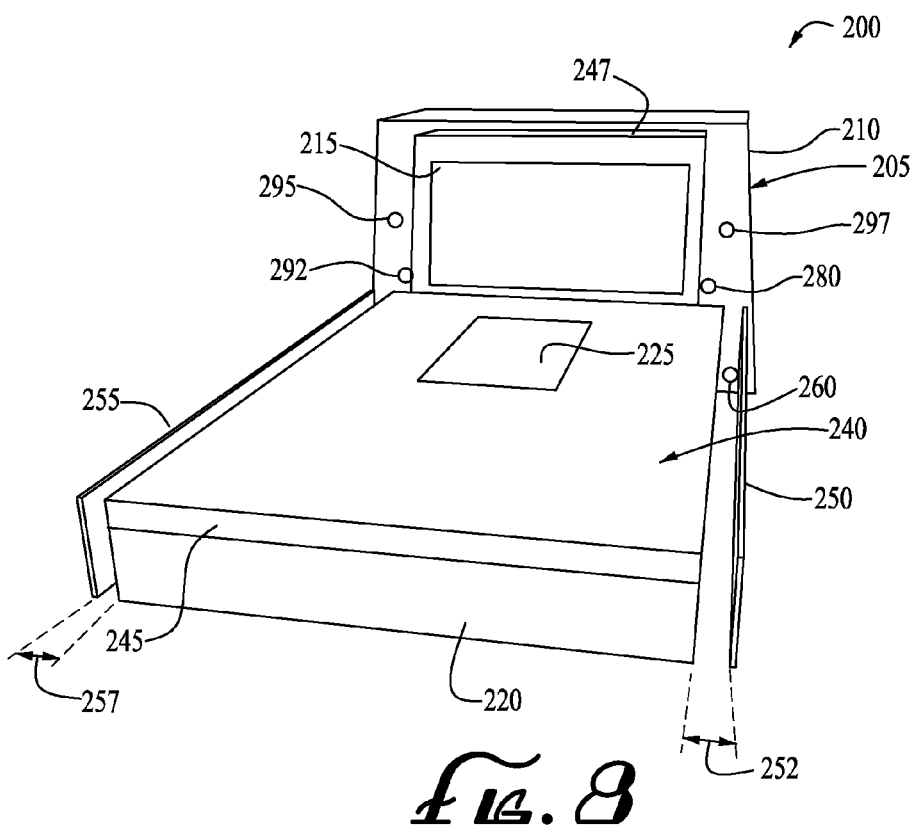
FIG. 8 is a diagrammatic front left side perspective view of an off-scale detection system according to a second embodiment.
Figure 9:
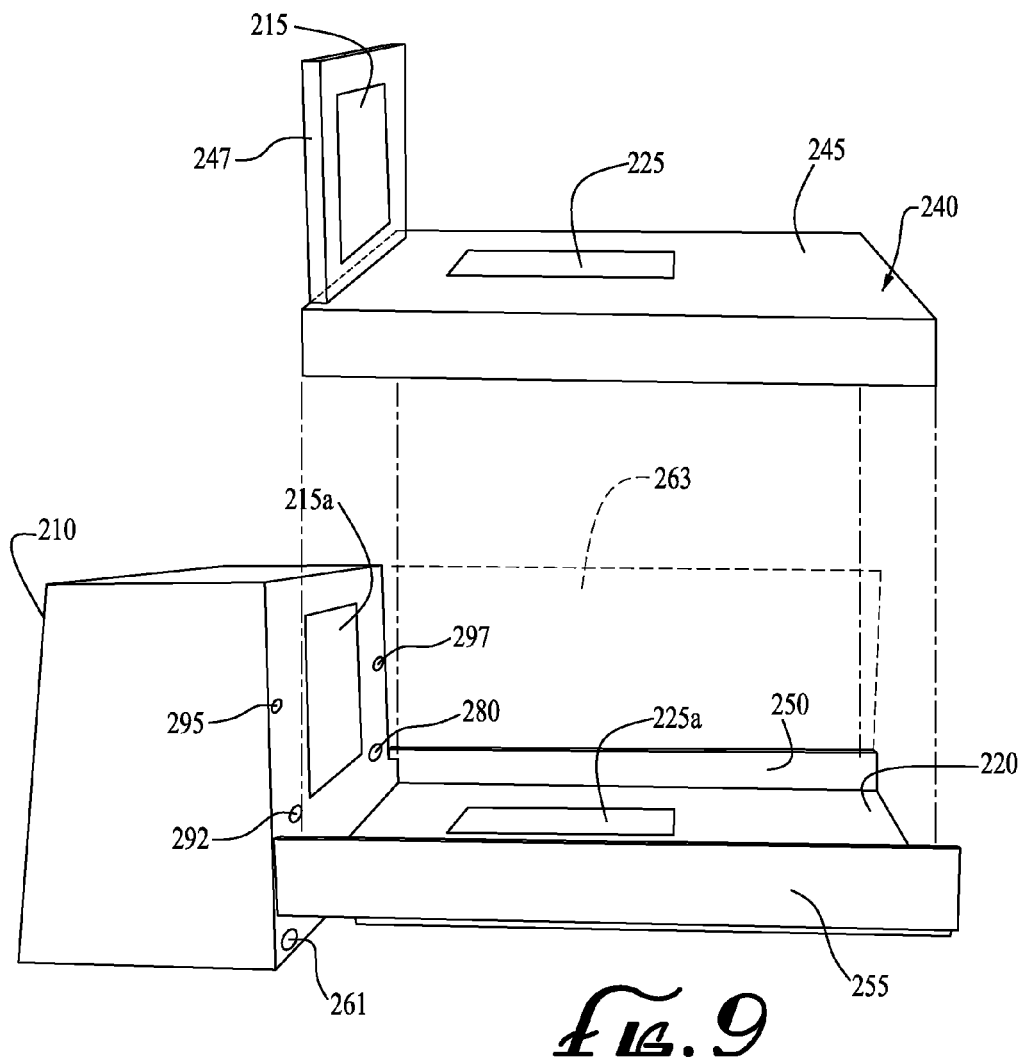
FIG. 9 is an exploded diagrammatic right side perspective view of the system of FIG. 8.
Figure 10:
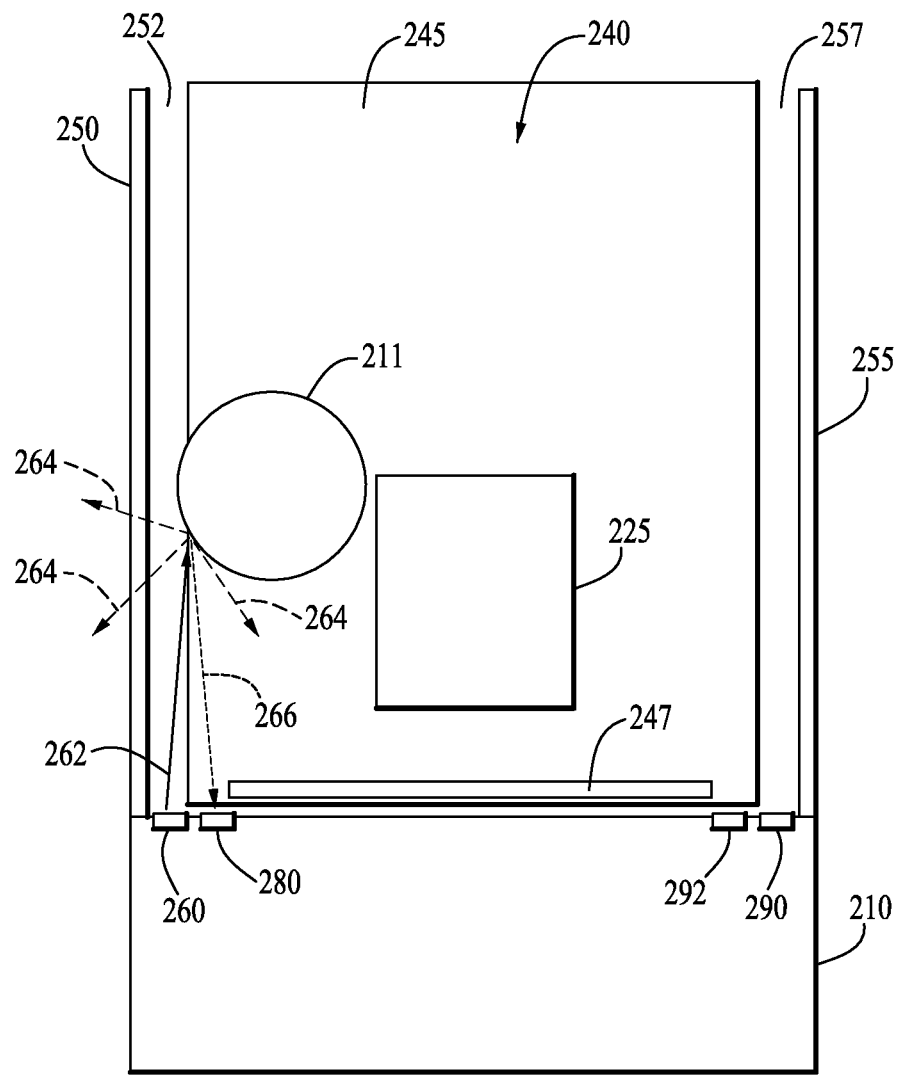
FIG. 10 is a diagrammatic top view of the system of FIGS. 8-9 further illustrating an object being detected.

FIGS. 8-10 illustrate another configuration of an off scale detection system 200 as applied to a two plane scanner-scale 205. The two plane scanner-scale 205 includes a housing comprised of an upper or vertical section 210 containing a vertical window 215a and a lower or horizontal section 220 including a horizontal window 225a. The scanner-scale 205 includes a weigh platter 240 suspended via a suitable mechanism onto a load cell. Though the weigh platter 240 may comprise a single plane (horizontal) configuration, the weigh platter 240 preferably comprises a two-plane weigh platter having a lower platter section 245 (containing the horizontal window 225) and an upper platter section 247 (containing an upper window 215) such as the All-Weighs® platter system available from Datalogic Scanning, Inc. of Eugene, Oreg., and as further described in U.S. Pat. No. RE40,071 hereby incorporated by reference. Preferably, the data reader sections will have secondary windows, namely lower window 225a containing the reader in the lower section 220 and upper window 215a containing the reader in the upper section 210. In the single plane horizontal/horizontal configuration, the upper platter section 247 would be omitted.

The scanner housing 210/220 includes a series of perimeter frame members 250, 255 one on each of the lateral sides of the horizontal platter section 245 forming respective gaps 252, 257 therebetween. Alternately, if the housing does not include frame members, the gaps are established between the lateral sides of the horizontal platter section and the checkout counter. Taking one of the lateral sides by way of example and referring to FIGS. 8-10, the light source 260 generates a beam of light 262 pointed up at an angle toward the air gap 252. The light source 260 generates a fan shaped beam of light that is partially obstructed by the perimeter frame 250 and platter 240. In this arrangement, the portion of the light beam 262 which does not strike any objects ends up forming what is essentially a plane of light 263 exiting the air gap 252 in a substantially vertical direction. FIG. 9 depicts a side view of the device with a far side light plane 263 propagating in a generally upward direction from the air gap 252. The light plane may generally be described as a light curtain. A light source 261 on the other side creates a similar light curtain with reflections detected by detector 292.

The light plane 263 may be created by action of the light beam 262 exiting the gap, wherein the gap is sufficiently narrow so as to inhibit lateral dispersion of the plane of light exiting the gap. Alternately, or in combination, a focusing lens, such as for example a cylindrical lens, may be provided proximate the light source 260 to create the desired planar effect for the light being directed into the air gap. In another example, a more collimated light beam, such as a laser, may be scanned or fanned to create the light curtain effect.

Figure 11:
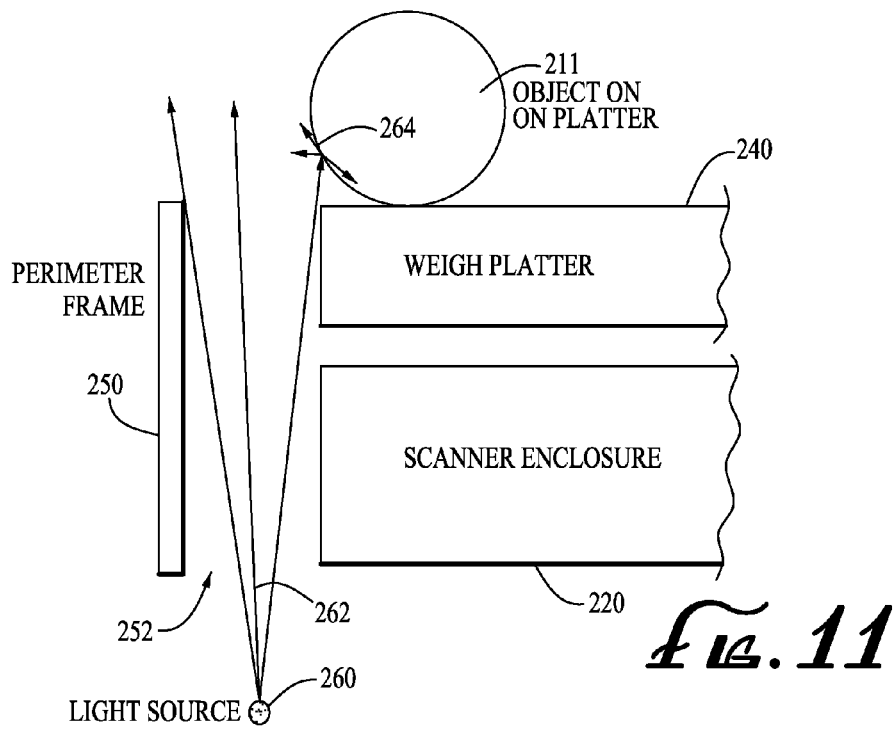
FIG. 11 is a diagrammatic end view of a portion of the system of FIGS. 8-10 on an enlarged scale showing action of the light rays on an item near the air gap.

FIGS. 10-11 show the scanner-scale 205 with an object 211 being weighed on the platter 240, the object extending over the air gap 252 and thus intersecting the light curtain 263/light beam 262 and thereby reflecting or refracting light, shown by reflected beams 264, 266. Some reflected beams 266 are reflected back toward detector 280 disposed on the vertical section 210 of the scanner housing. Though some of the reflected or scattered rays 264 go in various directions, certain of the scattered rays 266 are expected to reflect back toward the detector 280. A similar light source 290 is positioned within the gap 257 on the other side of the platter 240 and a separate detector 292 is disposed on the vertical housing section 210 as illustrated.

Upon detection of such scattered rays, the off scale detection system infers that an object is in the air gap 252 and thus potentially extends off of the platter 240 and therefore in contact with the frame 250 or checkout countertop potentially resulting in an inaccurate weight measurement. Thus upon such detection, the operator is notified by an indicator coupled to the detector 280, 292 such as by an audible signal or some visual signal thus prompting the operator to take remedial action.

One such visual signal may be a perimeter lighting system. When the item being weighed is properly centered within the confines of the platter 240, the perimeter lighting would alight in a green color indicating a proper and favorable weighing process. If the detection system detects an object passing over the gap 252 or 257, the perimeter lighting system would alight in a red color indicating a potential improper location for the object and potential for an improper weighing. Further details of perimeter lighting indicator systems will be described below with reference to FIGS. 16-18.

Because the amount of light scattered from objects near the air gap is small, it is preferable that a sensitive detection method be employed. In the preferred embodiment, the light sources are modulated in intensity over time, preferably being turned on and off at a rate in the tens of Hertz to hundreds of thousands of Hertz. Also in the preferred embodiment, a technique known as synchronous, phase sensitive, or lock-in detection may be used. This lock-in detection method allows detection of very small signals, synchronized to a reference frequency, in the presence of very large asynchronous noise. A lock-in method is described in Perkin Elmer Technical Note TN1000 "What is a Lock-in Amplifier?" hereby incorporated by reference. Other detection techniques may be employed, such as narrowband tuned amplifiers, or other suitable techniques.

FIG. 12 shows one channel of an example lock-in detection scheme 300 with the output of the lock-in amplifier connected to a digitizer. The detector 306 is typically a photodiode, such as a silicon PIN diode, which converts the incoming light from modulated source 302 which has been reflected from detected object 304 into a modulated current. This modulated current is applied to an amplifier 308 which boosts the level of the signal by typically many orders of magnitude. Often the amplifier 308 is AC coupled due to its very high gain characteristics. The amplified output signal from this amplifier is applied to a mixer 311 which typically electronically multiplies the amplified signal by the reference oscillator 312 signal. The output of the mixer is a signal with multiple frequency components whose average value represents the amount of illumination falling on the detector. The higher frequency components are removed from the mixer's 311 output by the low pass filter 314, leaving only a low frequency signal whose average value represents the amount of modulated light received by the detector. An optional stage or stages of amplification may follow, such as amplifier 316, to give additional amplitude to the signal before it is applied to a digitizer 318, the output of which is sent to the microcontroller for interpretation.

The output from each channel's digitizer 318 is applied to an input on a microcontroller. The microcontroller keeps track of the input signals and makes decisions about when to indicate potential weighing problems along with adjusting various stages in the lock-in amplifiers such as gain, offset, and phase in order to optimize performance. Because the amount of scattered light may vary over time due to many factors, the system may periodically "null out" a fixed amount of background signal. This nulling out may be best accomplished by performing the nulling operation when there is no weight on the scale and perhaps when no scanning activity is occurring. Because the system detects light scattered from the air gap, if debris accumulates in this gap that scatters sufficient light, this scatter will be detected by the system. This detection of debris can be a benefit, because it can notify the operator to keep the air gap clean, which is also essential for correct weight measurements.

Figure 13:
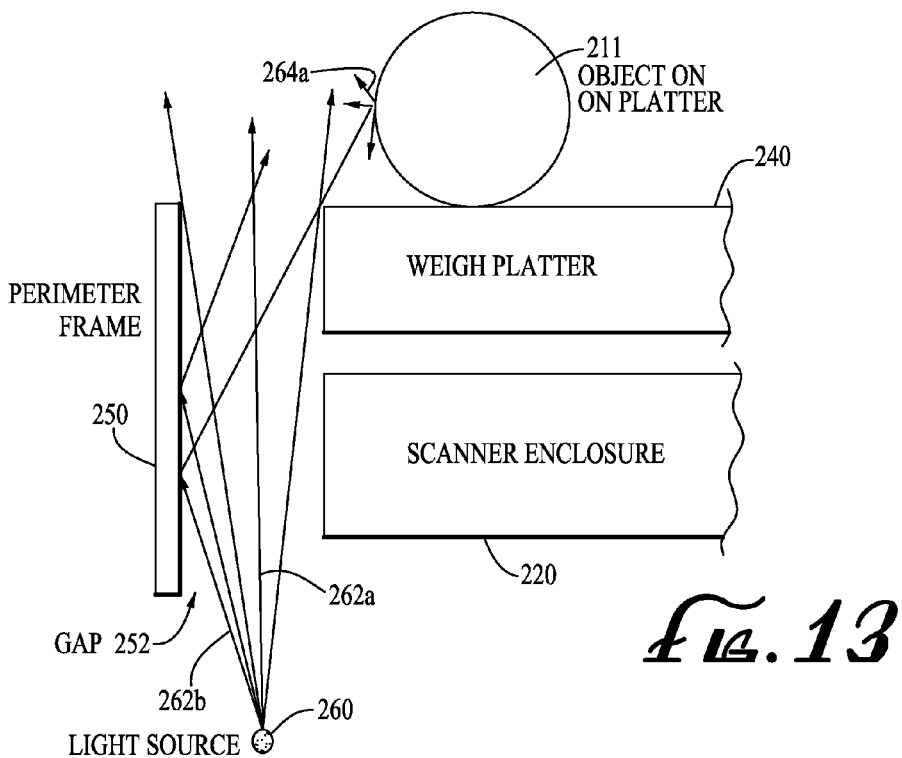
FIG. 13 is a diagrammatic end view of a portion of the system of FIGS. 8-10 on an enlarged scale showing action of unbaffled light rays on an item on the platter more distant from the air gap.

Because the system is very sensitive to light scattered from the air gap, it may be important to control unwanted stray scatter. If the walls of the surfaces defining the air gap, in this case the sides of the perimeter frame and the weigh platter, scatter light excessively, this excessive scatter will degrade the sensitivity of the system. An exemplary case is exhibited in FIG. 13. In the example, light 262a traveling more toward the center of the air gap 252 exits without reflection, but light 262b traveling less toward the center is scattered from the perimeter frame thereby allowing the angle of the outgoing rays to exit the air gap 252 at steeper angles, which in turn allows them to strike the item 211 further inward from the edge of the platter 240. The effect of this phenomenon widens the protection zone, which at some small level may be a desirable characteristic. Thus, in one embodiment, it may be desirable to control the amount of scatter to create a reasonably-sized protection zone perimeter surrounding the air gap.

Figure 14:
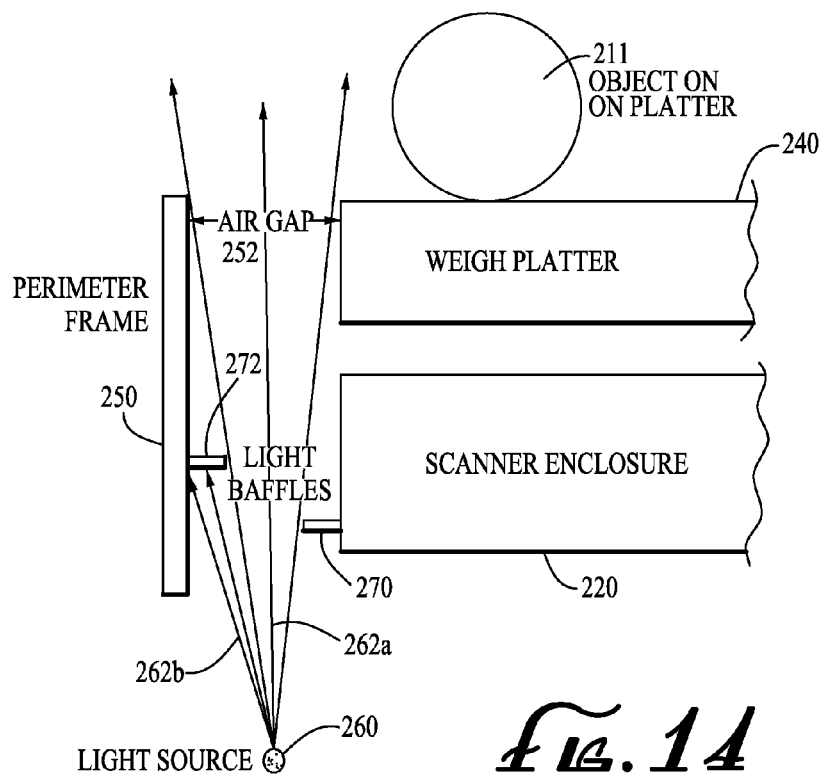
FIG. 14 is a diagrammatic end view of a portion of the system of FIGS. 8-10 on an enlarged scale and including light baffles proximate the light source.

One method to control scatter within the air gap is to provide various baffles to limit the possible angular spread of light. FIG. 14 illustrates one example of baffles 270, 272 placed to reduce the scatter shown in the previous figure. As shown in FIG. 14, the central light rays 262a are permitted to exit the air gap 252 while the baffles 272 block the light rays 262b thereby controlling angular spread of the light from the light source 260. The baffles 270 are placed on the perimeter frame and baffles 270 are placed on the lower scanner enclosure 270 well below the scale platter 240 so as not to narrow the air gap 252. It may be desirable to make the baffles 270, 272 thin to minimize the amount of surface from which light may scatter, but not so thin as to make the baffles sharp to the touch or fragile.

Figure 15:
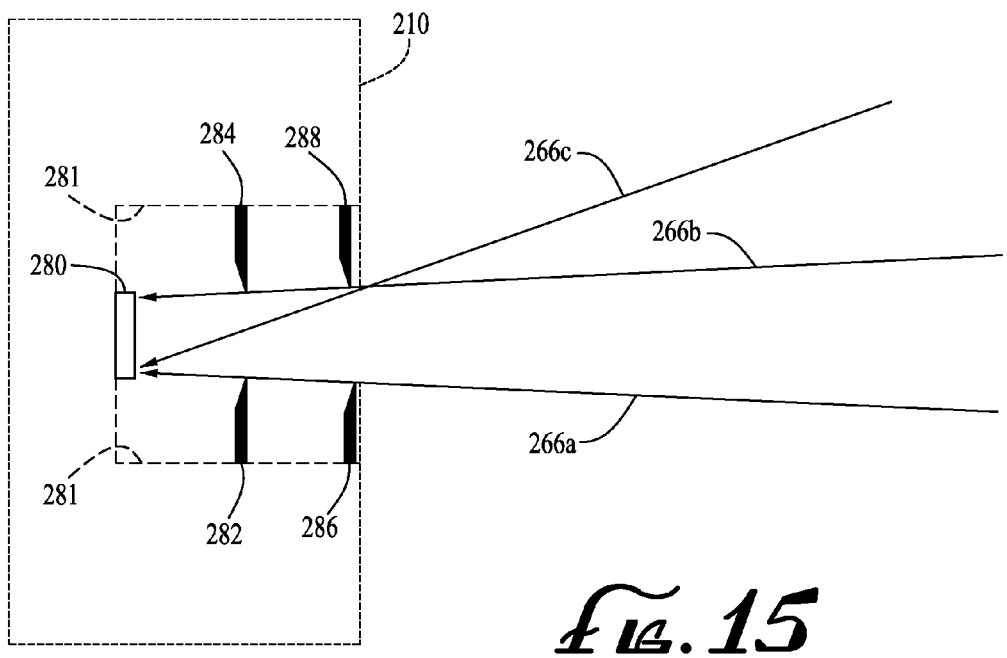
FIG. 15 is a diagram of a portion of the system of FIGS. 8-10 on an enlarged scale and including light baffles proximate the detector.

The detectors 280, 292 are preferably inset within the scanner housing so that they may not look directly at light scattering from the gaps. FIG. 15 illustrates one embodiment where the detector 280 is inset or recessed within the upper housing section 210. Off-axis external light is inhibited from reaching the detector 280 by the side walls 281. Additional light scatter inhibitors may be provided such as baffles, lenses, or other light limiting means in front of the detectors 280, 292 to limit the scatter and field of view as seen by the detectors. FIG. 15 illustrates one example of baffling to protect the detector 280 from receiving unwanted light scatter. The baffles 282-288 extend inwardly from the side walls 281 into the opening. The baffles may be made sharper/thinner than the baffles 270, 272 in the vicinity of the air gap because they are inaccessible under normal use. The detector 280 receives light coming from small angles, shown by rays 266a, 266b, up to a maximum angle, shown by limiting rays 266c. Rays beyond this limit are inhibited by the baffles from reaching the detector 280. The maximum ray angle which the detector assembly will receive depends upon several factors, including the size and location of the baffles, the detector size, offset of the detector from the enclosure surface, among others.

In operation, the system may have light indicators on the scanner-scale housing (visible to the operator) which change when the scale perimeter is encroached. In a preferred system, one visual indicator (such as an LED) is provided on each lateral side of the vertical enclosure 210 substantially in line with each air gap 252, 257, but raised high enough to be visible in the presence of items being weighed. Each indicator would be associated with its own lateral air gap. An example location of such indicators is shown in FIG. 8. In this example, if an item were encroaching the left side gap 252, then the left side indicator 295 would show a warning, such as by an LED turning on. Or if an item were encroaching the right side gap 257, then the right side indicator 297 would be turned on. In addition to indicating a potential weighing problem, the system may also inhibit weight information from being sent from the scale to the POS until the condition is corrected or acknowledged by a suitable mechanism.

Figure 16:
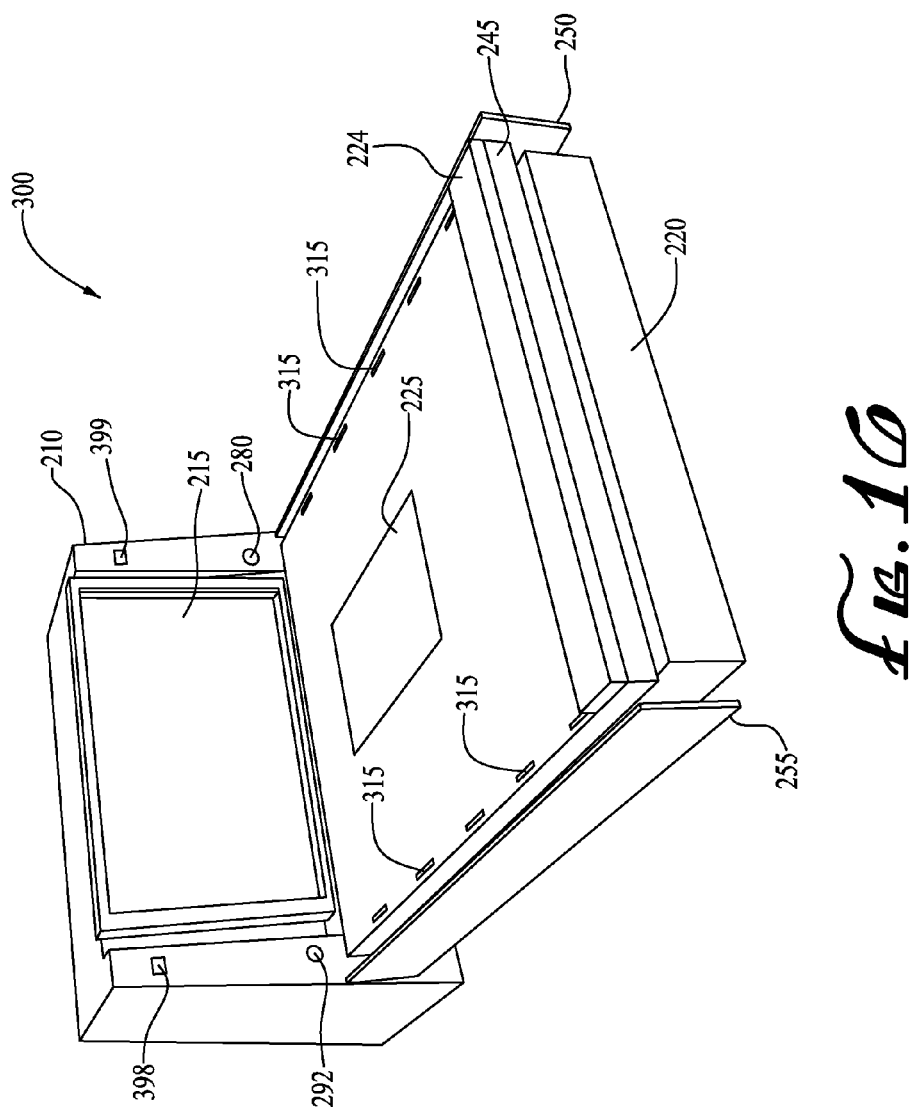
FIG. 16 is a front right side perspective view of an indicator system for use with an off scale system.
Figure 17:
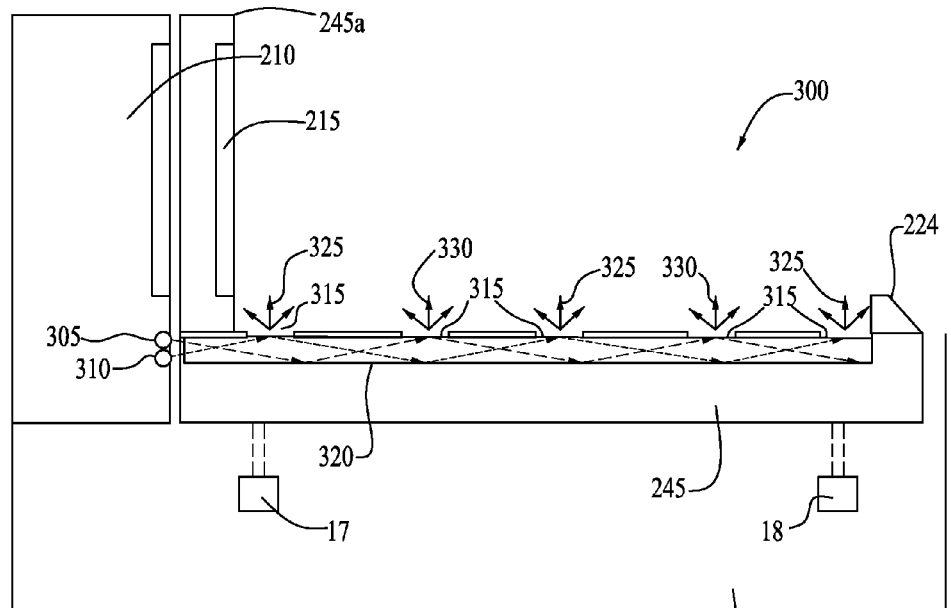
FIG. 17 is a diagrammatic side view of the system of FIG. 16.

Other configurations for visual indicators may be employed. FIGS. 16-17 illustrate one embodiment of a perimeter lighting system 300 that may be employed in any of the above embodiments, but will be shown as a modification of the system 200 of FIGS. 8-11. The top surface of the lower platter section 245 has openings 315 in the platter's typically opaque material to allow light to exit from a light pipe 320 disposed under the surface. The openings 315 on the edges of the lower platter section 245 may alternately be replaced by single continuous openings on each side, covering the same general linear area.

Details of the underlying concept for the system 300 are illustrated in FIG. 17. A light guide 320, not to be confused with the light guide used for sensing off-scale items in other figures, is disposed in the lower weigh platter section 245. One or more light sources 305, 310 are disposed in the housing section 210 next to the edge of the weigh platter 245. The light guide or light pipe 320 carries visible illumination from the source or sources 305, 310 along the edges of the weigh platter 245. The light guide 320 may have a rectangular, circular or other suitable cross section. The top surface of the light guide 320 is modified to allow a certain amount of light to leak out along the guide's length. This treatment of the top surface may be surface roughening, small repeated faceting, or other patterning or openings to control light leakage along the length of the light guide 320. A desirable characteristic of the surface treatment is that the amount of light that leaks along the guide's length at any point is approximately the same, thus making the perimeter pattern's visible illumination approximately uniform along the entire length. Openings 315 in the opaque surface of the platter 245 allow the leaked light to be visible to the operator. If two colors are desired for a "go/no-go" indication, either two separate sources of different colors 305 and 310, may be used, or one multicolor source may be used. Although schematically FIG. 17 shows the two colors leaking at separate locations 325 and 330, it should be understood that this is for diagrammatic purposes, and that many light rays at many varying angles are being launched into the light guide 320 from both sources 305, 310, so that approximately equal amounts of both colors will be leaking from each point along the guide's surface.

Figure 18:
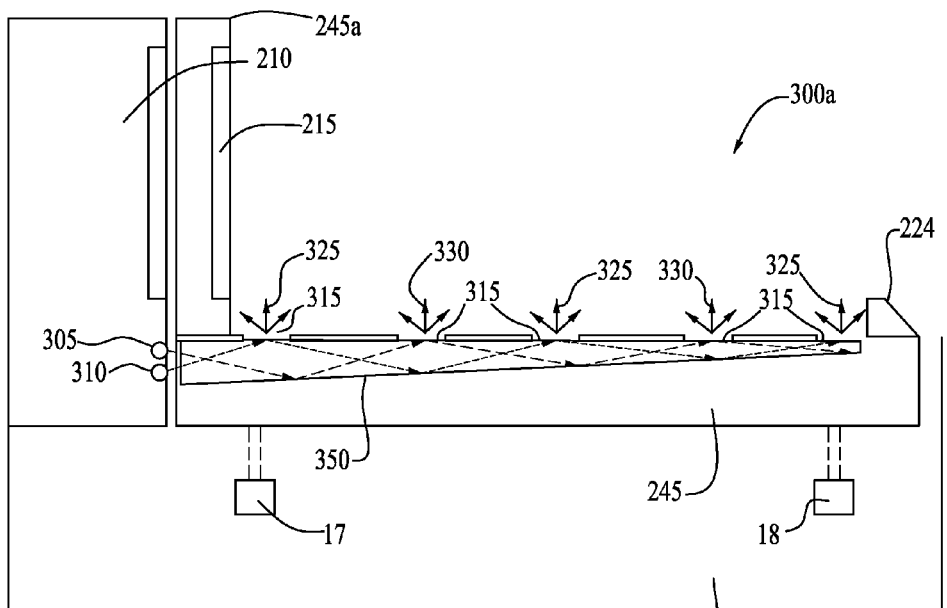
FIG. 18 is a diagrammatic side view of the system of FIG. 16 according to an alternate configuration.
Figure 19:
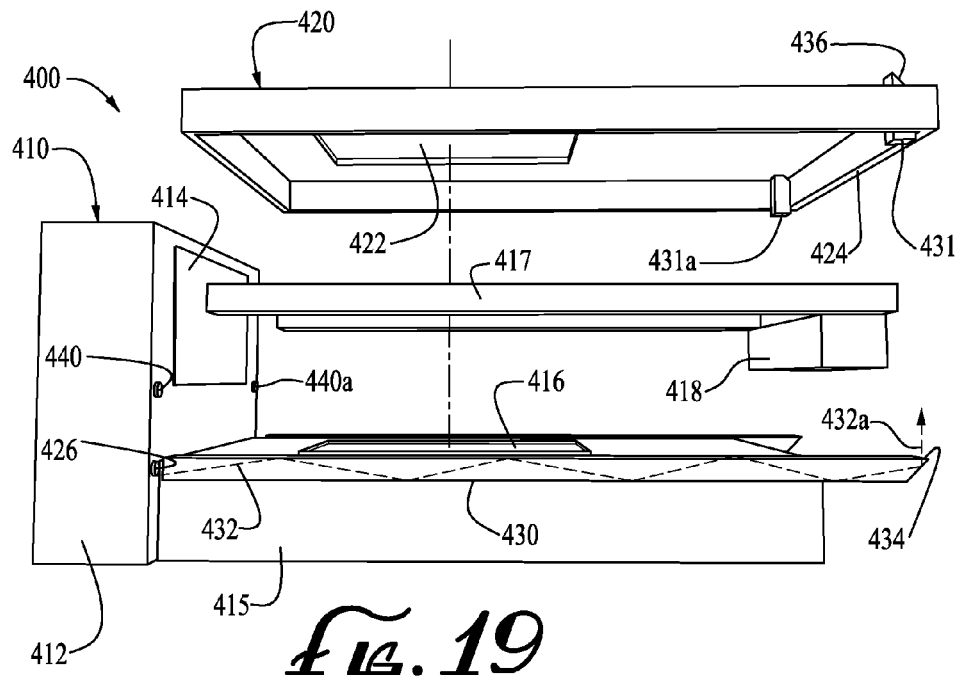
FIG. 19 is a bottom right side, exploded perspective view of an off-scale system according to another embodiment.
Figure 20:
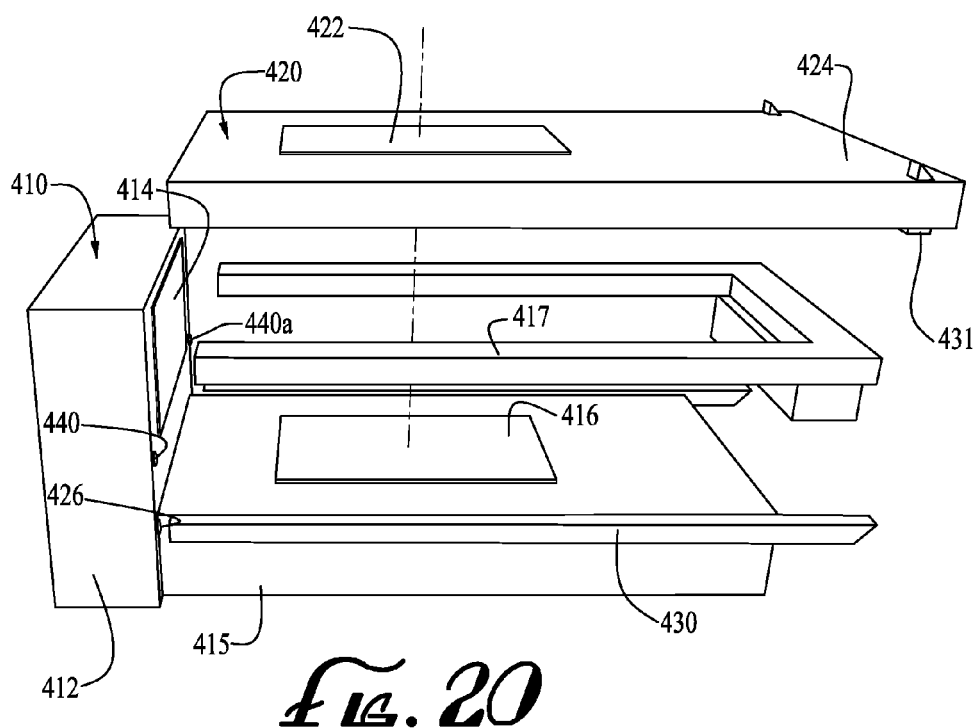
FIG. 20 is a top right side, exploded perspective view of the system of FIG. 19.
Figure 21:
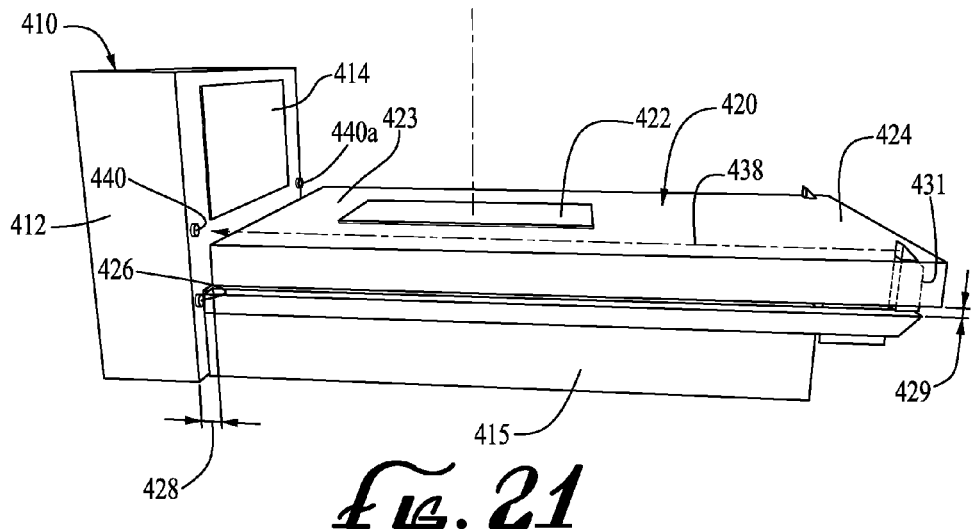
FIG. 21 is a top right side perspective view of the system of FIGS. 19-20.
Figure 22:
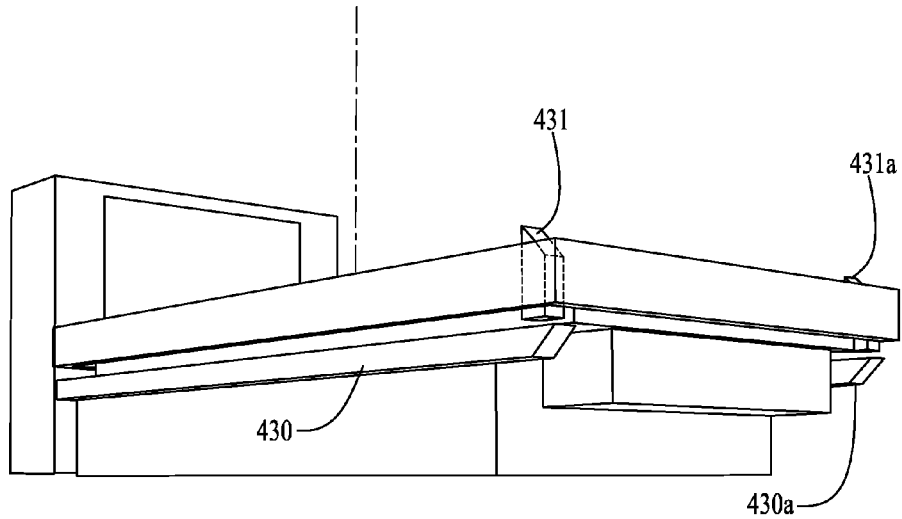
FIG. 22 bottom front right side perspective view of the system of FIGS. 19-21.

FIG. 18 illustrates an alternative perimeter lighting system 300a. Each of the elements of FIG. 18 are the same as in the lighting system 300 of FIGS. 16-17, except that the light guide 350 may be tapered from one end to the other (widest proximate the light sources 305, 310) to create the desired leakage. A tapered light guide may also preferably be rectangular in cross-section. By tapering the size of the light guide 350, the intensity of light escaping through the openings 325, 330 is held more constant over the length of the guide. For example, if the light guide is a round cylindrical light pipe, the diameter of the light pipe is tapered to have a smaller size diameter distal to the light sources 305, 310. The light intensity being more concentrated distal to the source via the smaller diameter light pipe compensates for the distance from the source and the light loss from the prior openings thus providing a more uniform intensity light for the off-scale light indication.

U.S. Patent Publication No. US 2010/0139989, hereby incorporated by reference, describes details for other methods of detecting that may be combined with or modify the off-scale detection systems or methods described herein. For example, in another alternative configuration, the perimeter lighting system 300 or 300a may be used as a brightly-defined edge pattern to be detected by an imager and compared at different times to determine if an off-scale item is present due to change in the image detected. For example, each of the cameras 398, 399 (as shown in FIG. 16) disposed in or on the upper housing section 210 may detect a linear view of the edge portion of the platter 245 including the pattern of light exiting the openings 315. When an off-scale item is placed across the edge, light from one or more of the openings 315 is either blocked or reflected causing a substantial change in the image received by the camera 398 or 399. Alternately, where the scanner-scale is an imaging-based data reader, the imager looking through the upper window may read/process a strip of the side edge including the openings 315 to detect presence of an item placed across the edge blocking the light from the openings 315 thus eliminating the need for the separate cameras 398, 399. In the imager example, a portion of the imaging sensor's field of view may be used to read/image the pattern of edge lighting 315 extending along opposing edges of the weigh platter. A set of mirrors is configured to redirect a portion of the imaging sensor's field of view so that the portion of the field of view is in-line with the pattern (e.g., the portion of the field of view is looking straight at the pattern). According to one embodiment, the set of mirrors are positioned in the upper housing 210 and comprise final redirecting mirrors and intermediate redirecting mirrors interposed between the final redirecting mirrors and the imager. The final redirecting mirrors are positioned on opposing sides of the weigh platter such that the final redirecting mirrors lie in same plane as the scan plane associated with the respective platter edge including the openings 315. Intermediate redirecting mirrors are positioned between the final redirecting mirrors and the imager to direct the respective scan planes onto the imager.

The US 2010/0139989 application also discloses additional details for controller and alarm modules (particularly with reference to FIG. 2 therein, and the corresponding description, previously incorporated by reference) that may be used in conjunction with and implementing the above-described embodiments.

FIGS. 19-22 illustrate an alternate off-scale or overhang condition system 400 similar to the system 5 of FIGS. 1-2 and the system 5a of FIGS. 3-4. Though example system 400 in FIGS. 19-22 is described in a multi-plane scanner 410 having a configuration with a single plane weigh platter, the system may be used in other scale systems such as a multi-plane weigh platter, a single window scanner-scale with either vertical or horizontal window, or a combination scale system wherein the scale is separate from the scanner. Moreover, the scanner may comprise a laser-based scanner, an imaging-based scanner, an RFID reader, or any suitable reading device.

In the illustrated embodiment of FIGS. 19-22, the off-scale system 405 is applied to a scanner-scale 410 having a lower housing section 415 and an upper housing section 412. The scanner-scale 410 includes a weigh platter 420 supported/suspended via a suitable mechanism onto one or more load cells or via a platter support/spider 417 onto load cell 418. The weigh platter 420 is separated from the upper housing section 412 by a gap 428 (see FIG. 21) and is separated from the lower housing section 415 by gap 429 (see FIG. 21) so as not to contact the stationary sections of the scanner housing. The scanner 410 has an upper/vertical window 414 disposed in the upper housing section 412, a platter window 422 disposed in the weigh platter 420, and a lower window 416 disposed in the lower housing section 415. A light source or emitter 426 is installed in or on the housing, preferably below the plane of the platter 420. A light guide 430 is disposed below the weigh platter 420 proximate a side edge thereof, the light guide 430 extending from the head edge 423 of the platter 420 proximate the light source 426 to the opposite end or foot section 424 of the platter 420. The light guide 430 is supported on the scanner housing (e.g., the lower housing section 415) and not attached to the weigh platter 420. The light guide 430 may contact or surround the light emitter 426 (e.g., the light emitter may be disposed inside the front end of the light guide 430), or the light guide 430 may be separated by a gap therefrom. Light 432 projected from the light source 426 enters and travels within the light guide 430 and upon reaching a position below the foot section 424 of the platter is reflected upward via a reflecting feature 434, the light traveling in an upward path 432a passing through a gap 429 between an exit point of the light guide 430 and a bottom of the weigh platter 420, and then enters a second light guide 431 disposed in the platter 420. The light 432a passes upward through the second light guide 431 and thus through the platter 420, and is then reflected in a reverse direction via reflecting feature 436 along a return path 438 toward the detector 440 disposed on the vertical housing section 412.

The reflecting features 434, 436 may comprise reflecting mirrors or may be merely angled or curved sections of the light guides 430, 431. The second light guide 431 may be omitted with reflecting feature 434 (e.g., mirror) reflecting light 432 from the first light guide up through a hole or notch in the platter 420 and to the second reflecting feature 436. The light guides 430 and 431 may comprise a light pipe of any suitable construction and as previously described per other embodiments. The light pipe 430 may be formed to include a separate lens or lens function to shape the light beam 432 and/or 432a. Additional field-of-view controls may be provided for the detector such as baffles, apertures, lenses or combinations thereof. The light source 426 may be provided with suitable focusing optics. The light beam 432 may be generated in any suitable wavelength, but is preferably in the non-visible range of near-infrared.

Light from the light source 426 thus travels from the source, through the light pipe 430 reflecting off the pipe sides (as shown by path 432), up through light pipe section 431 and along return path 438 to detector 440. In similar fashion as described previously with reference to FIG. 2, when an item is positioned partly on the platter and either proximate the edge of the platter or partly on the platter but extending off the platter and onto the counter, the item will interrupt the light path 438. When so blocked, light from the light source 426 is partially blocked from reaching the detector 440 and from the change in light reaching the detector 440 it is inferred (via operation of a suitable controller operatively connected to the detector) that the item may be "off-scale" and an alarm, audio or visual, is actuated notifying the operator that the item may indeed be off-scale and in contact with the counter potentially resulting in an inaccurate weighing.

Preferably, a duplicate set of system features is disposed on the other side of the platter 420, including far side light pipe 430a and far side second light guide 431a, etc.

The second light guide 431 may be omitted and in place a hole or window is provided in the weigh platter 420 to permit passage of the light segment 432a through the platter 420 and then reflected by the reflector element 436 to direct the light beam 438 to the detector 440.

Figure 23:
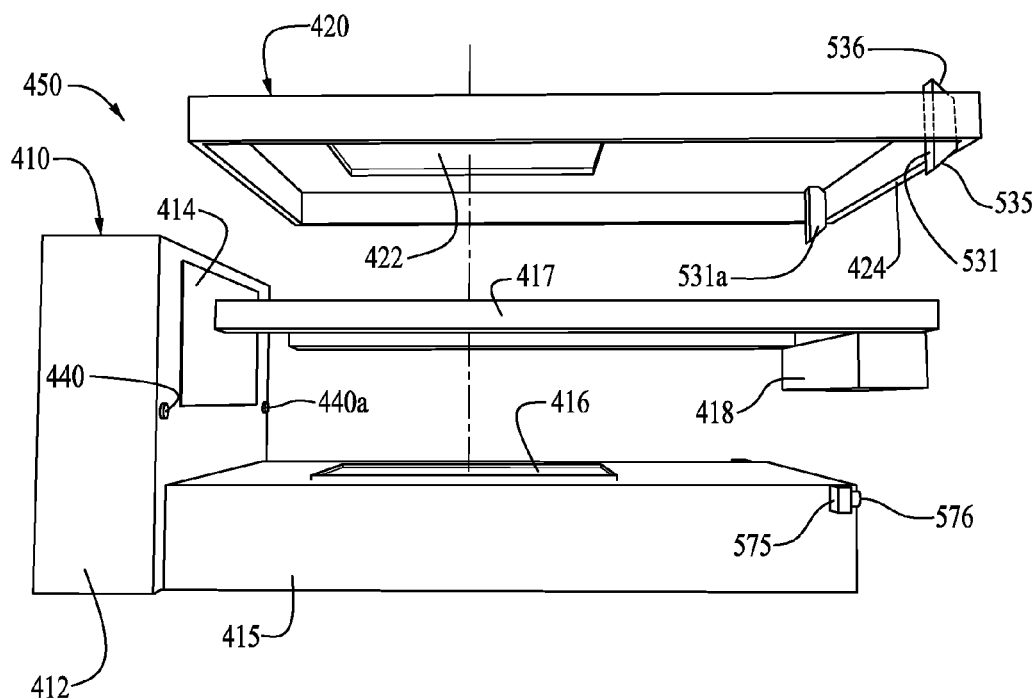
FIG. 23 is a bottom right side, exploded perspective view of an off-scale system according to another embodiment.
Figure 24:
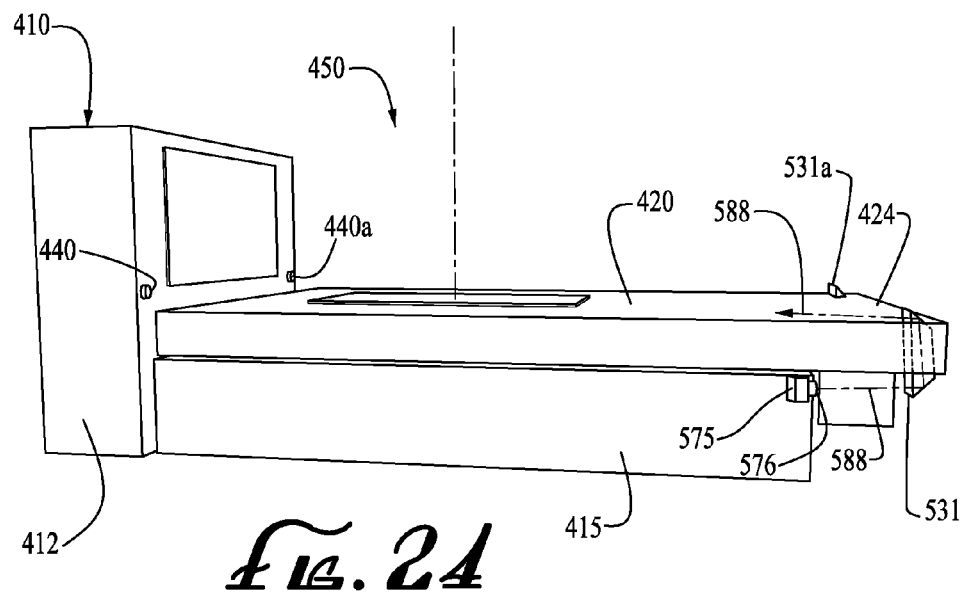
FIG. 24 is a top right side perspective view of the system of FIG. 23.
Figure 25:
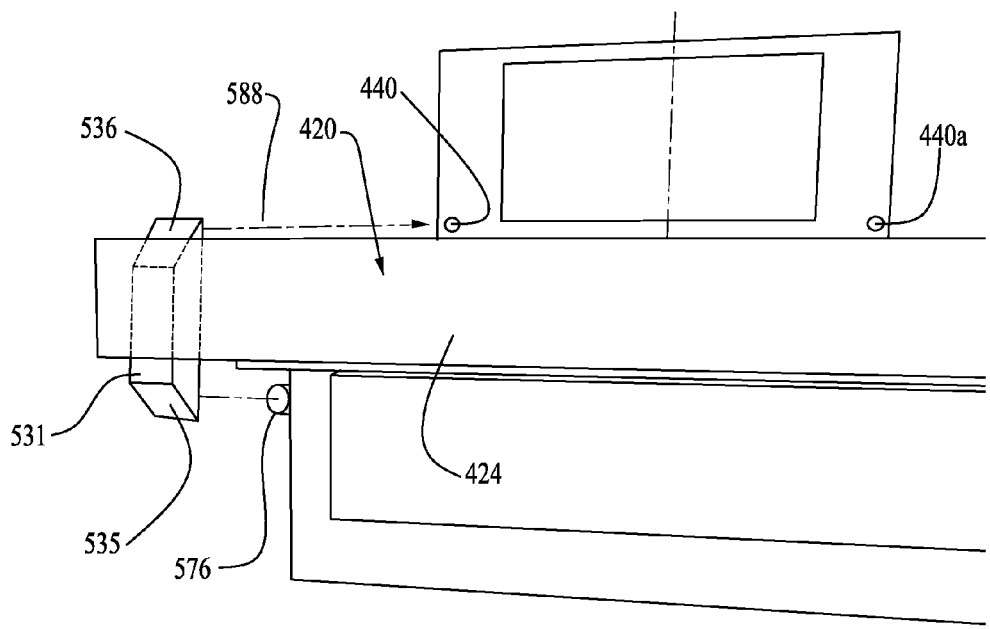
FIG. 25 is a front side perspective view of a front portion of the system of FIGS. 23-24 on an enlarged scale.

FIGS. 23-25 illustrate another embodiment 450 similar to the system 405. Common elements are identified by the same element numerals and are not repeated. In place of the light guide 430, the light emitter 576 is mounted (for example by a suitable mount structure 575) to the lower housing section 415 nearer to the foot section 424 of the platter 420. Light 588 from the emitter 576 is directed along an optical path to a first reflector 535. The shorter light guide 531 is disposed in the weigh platter 420 whereby the light 588 is directed along a path to reflect (via a reflector 535 in the bottom of the light guide 531) the light beam 588 from the light emitter 576 up through the platter 420, and then reflect off the reflector 436 on a path toward the light detector 440. The light guide 531 may be horizontally extended (into an L-shape) to proximate the light emitter 576. The reflector 535 may be included/enclosed within the light guide 531 or may be separately mounted and separated therefrom by a gap. Alternately, the reflector 535 may be omitted if the light emitter 576 is positioned in line directly below the reflector 536 aiming the light beam 588 upwardly through the light guide 531 toward the reflector 536. In yet another alternative construction, potentially due to the shorter distance, the light guide 531 may be entirely omitted and only the reflector 535 or reflectors 535, 536 provided, the light beam 588 passing along a pathway through the platter 420. The pathway may comprise a hole or passage, preferably sealed off by a transparent window in the top surface of the platter 420.

In each of previously described light guide systems (namely system 5, 5a of FIGS. 1-4, system 100 of FIG. 5, system 150 of FIGS. 6-7, system 400 of FIGS. 19-22, or system 450 of FIGS. 23-25), the positions of the light emitters and light detectors may be switched/reversed. In these systems, the light guide is disposed in the housing and extends along and/or through the weigh platter, wherein the light guide is disposed in the light path (the light beam passing therethough) and provides a portion (or at least a portion) of the optical path for light beam between the light source and the detector. In certain of the disclosed embodiments, such as for example the emitter 26 and the detector 40 in the scanner-scale 10 of FIGS. 1-4, the emitter 126 and the detector 140 in the scanner-scale 110 of FIG. 5, the emitter 180 and the detector 188 in the scanner-scale 160 of FIGS. 6-7, or the emitter 426 and the detector 440 in the scanner-scale 410 of FIGS. 19-22, both the emitter and the detector are disposed in or on the upper housing section and proximate the same side of the weigh platter.

Various systems have been disclosed to detect the condition of a weighable item partially overhanging the scale platter onto the adjacent non-weighing countertop. The overhang condition often produces reporting of inaccurate weight data from the scale device. The various detectors devised to sense the occurrence of such a possible state are operable to both warn the operator by various visible and/or audible indications as well as to optionally disable transmission of weight data until the condition is cleared.

In an alternate embodiment, the perimeter detection system may be configured to report additional data about the condition of weigh scale veracity when the condition of off-scale weighing occurs providing useful insight to store operations.

In one example, if the scale receives a weight request from a connected POS device and the overhanging condition is sensed by the detectors, the system may respond with a weight and some extra appended data that indicates (a) the overhanging condition; (b) identification of which side of the platter is affected. This feature may be particularly useful for stores that are transitioning to new scanner/scale systems that include such a scale perimeter monitoring option. It may be desirable to not to fully disable weight reporting during an overhanging condition as it may be determined that such disabling may negatively affect store throughput until personnel get used to the new system. This option allows monitoring how often weight transactions may be incorrect, which can be useful in store loss analysis and operator training evaluations.

Figure 26:
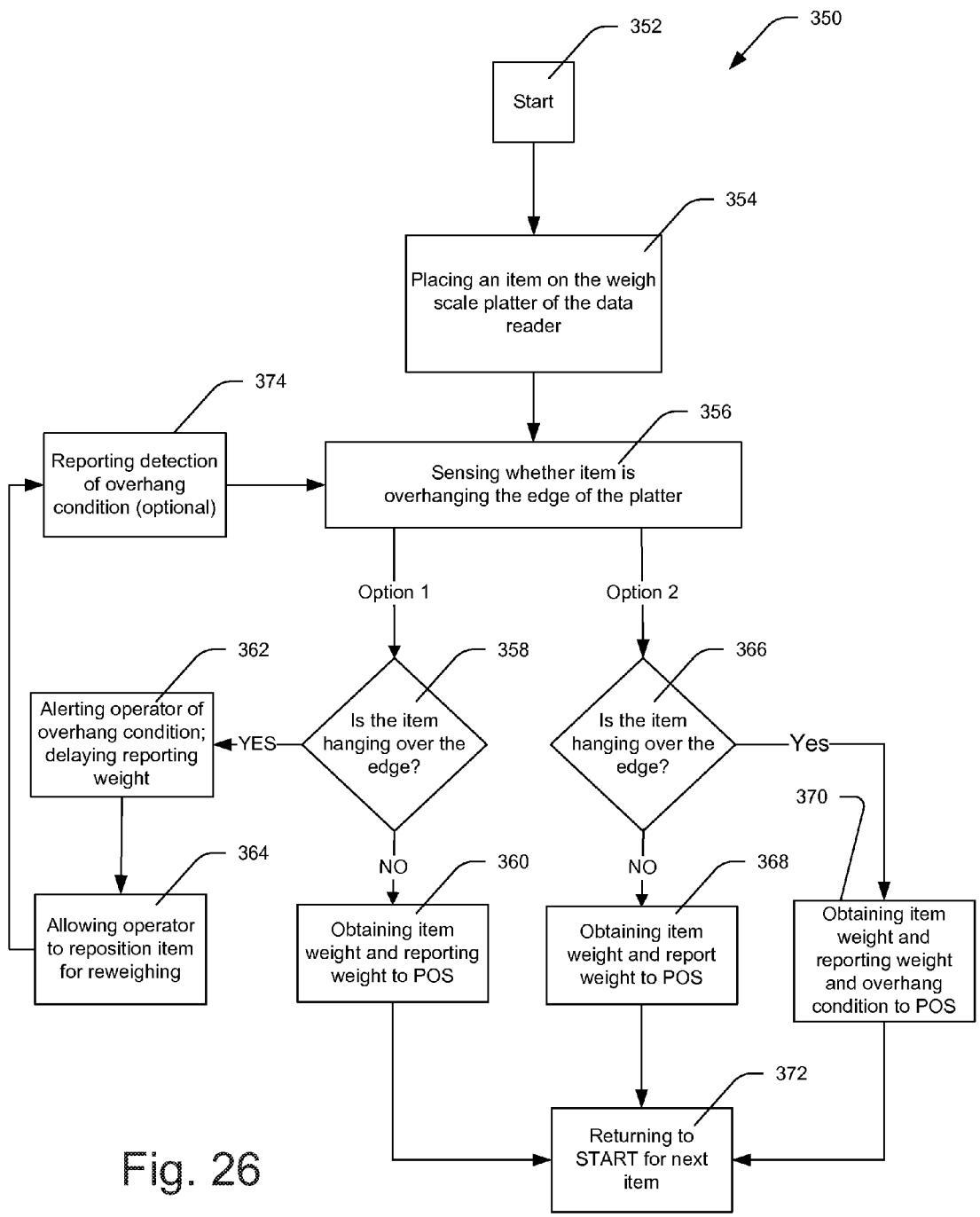
FIG. 26 is a flow chart of a method of operation according to a preferred embodiment.

FIG. 26 is a flow chart of a process/method 350 for handling and responding to detection of items encroaching upon or overhanging the edge of the weigh platter. With respect to the following description, the process 350 will be described and illustrated with reference to overhang or off-scale condition, but the description is intended to be equally applicable to encroachment on the edge of the weigh platter. The process 350 may include the following steps:

Step 352: Start.

Step 354: Placing an item on the weigh scale platter of the data reader for weighing the item.

Step 356: Using one of the methods/systems described above, sensing whether the item is encroaching upon or overhanging an edge of the platter, an item overhanging the edge thus has potential for weighing error. From this step, two (optional) courses of action may be taken.

Option 1, proceeding to Step 358 for determined whether the item is hanging over the edge. If it is not hanging over the edge of the platter (the No condition), proceeding to Step 360.

Step 360: Obtaining item weight from the scale and reporting the weight to the POS, and then proceed to Step 372 and return to Start Step 353 for next item.

If at Step 358 it is determined that an item is hanging over the edge of the platter (the Yes condition), then proceed to Step 362 whereby the operator is alerted to the overhang condition and the weight is not reported to the POS.

Step 364: After being alerted of the overhang condition, the operator is allowed (or instructed) to reposition the item for weighing, preferably to position the item such that it does not overhang the edge of the platter. The method/operation then proceeds or returns to Step 356 to re-sense whether there is an overhang condition.

Option 2, proceeding to Step 366 for determining whether the item is hanging over the edge. If it is not hanging over the edge (the No condition) proceeding to Step 368.

Step 368: Obtaining item weight from the scale and reporting the weight to the POS, and then proceed to Step 372 and return to Start for next item.

If at Step 366 it is determined that that an item is hanging over the edge (the Yes condition), then proceed to Step 370 where item weight is obtained and both the overhang condition and the item weight are reported to the POS or host. The overhang condition data may be appended to the item ID data obtained by the data reader, separately sent to the POS/host, or via another suitable reporting method. Alternately, the operator may be alerted as to the overhang condition and given the opportunity to correct, but even if no action is taken, the weight is nonetheless obtained and reported under this Option 2 process.

Once the item weight is obtained and reported, the process proceeds to Step 372 for returning to the Start Step 352.

The data pertaining to the off-scale/overhanging condition may be reported by appending data to the weight information or sending an extra message pertaining to the overhang condition, separate from the weight data, such as in a "special" or "phantom" barcode (i.e., non-item identification data such as disclosed in U.S. Pat. No. 7,527,198 hereby incorporated by reference) or as special PLU (price look-up) data.

Thus the scale perimeter protection system may be configured to inhibit weighing operations until it is determined that there is no item in an off-scale condition. Following are several methods by which the system may inhibit the weighing operation:

The system may inhibit the transmission of weight data to the POS terminal until it detects the off-scale item condition is cleared.

The system may send clearly invalid weight data to the POS terminal, which can be interpreted by the POS terminal as such, until it detects the off-scale item condition is cleared.

The system may send an indication to the POS terminal that the scale data is unavailable or invalid or some other status message until it detects the off-scale item condition is cleared. When weighing, a scale typically has an "in-motion" determination capability. As long as the user is moving objects on the platter, the scale is in-motion and will not settle on a weight value (and will thus delay sending any weight value to the POS until settling on a weight value). Alternately, the scale system may send an in-motion scale status to the POS terminal. In one method, the off-scale state may be communicated to the POS by sending an "in motion" scale status to the POS terminal, which is an indication from the scale which is typically already in use by scanner-scale-POS systems to defer weighing operations until the "in motion" status is no longer transmitted.

Thus while certain preferred embodiments and applications have been shown and described, it will be apparent to those having skill in the art that many changes may be made to the details of the above-described embodiments without departing from the underlying principles of the invention. The scope of the present invention should, therefore, be determined only by the following claims.

The invention claimed is:

1. A system for reducing erroneous weighing of an item on a weigh platter of a scanner-scale, comprising
   a light source disposed in or on a housing of the scanner-scale for producing a light beam;
   a detector for receiving the light beam, the detector disposed in or on the housing, wherein the light beam is directed along an optical path extending (a) from the light source, (b) along a path proximate an upper side edge of the weigh platter, and (c) to the detector,
   a light pipe disposed in the housing and extending along and/or through the weigh platter, wherein the light pipe provides at least a portion of the optical path for the light beam between the light source and the detector,
   wherein the detector is operative for detecting an interruption of the light beam due to an item encroaching upon or overhanging an edge of the weigh platter.

2. A system according to claim 1 further comprising an indicator coupled to the detector for signaling an operator of an item overhanging an edge of the weigh platter.

3. A system according to claim 1 wherein the light pipe has a round cylindrical shape.

4. A system according to claim 1 the light pipe is disposed in the weigh platter below a top surface of the weigh platter, the light pipe extending from an edge of the weigh platter proximate the light source and routing the light beam to the detector.

5. A system according to claim 4 wherein the light pipe is attached to and supported by the weigh platter.

6. A system according to claim 1 further comprising a scanner-scale including a housing having a lower housing section and an upper housing section joined to form a generally L-shape; and a weigh platter disposed in or on the lower section, the weigh platter being supported by at least one load cell.

7. A system according to claim 1, wherein the light pipe is disposed in the housing with one end proximate the light source and extending along and below the weigh platter, wherein the light pipe is unsupported by the weigh platter, the light beam being directed from the light source, through the light pipe, up through the platter and then along a path proximate an upper side edge of the weigh platter toward the detector.

8. A system according to claim 1, wherein the light pipe is disposed in the weigh platter wherein the light beam is directed along a vertical path through the light pipe.

9. A system according to claim 1, wherein the light pipe has a rectangular cross-section.

10. A system according to claim 1 wherein the light pipe is disposed in the housing and extending through a hole in the weigh platter.

11. A system according to claim 1 wherein the weigh platter includes a window, and wherein the light pipe is disposed in the housing and extending through the window in the weigh platter.

12. A system according to claim 1 wherein the light pipe is disposed along and below the weigh platter.

13. A system according to claim 1 wherein the light pipe includes at least a first portion, the first portion being disposed under the weigh platter and independently supported therefrom.

14. A system according to claim 13 wherein the light pipe includes a second portion, the second portion being disposed in and passing vertically through the weigh platter and supported thereby.

15. A method of reducing erroneous weighing of items on a scale at a checkout system, comprising the steps of
directing a light beam from a light source in a light path along at least one side edge of a weigh platter of the scale and to a detector;
over at least a portion of the light path, routing the light beam within a light pipe disposed in or along the weigh platter;
detecting an interruption of the light beam due to an item overhanging an edge of the weigh platter.

16. A method according to claim 15 further comprising upon detecting an item interrupting the light beam, signaling an operator of an item overhanging an edge of the weigh platter.

17. A method according to claim 15, further comprising upon detecting an object interrupting the light beam, delaying completion on a weighing operation until interruption of the light beam is no longer detected.

18. A method according to claim 15 further comprising alerting the operator if an off-scale condition is detected.

19. A method of reducing erroneous weighing of items on a scale at a checkout system, comprising the steps of
directing a light beam from a light source in a light path along at least one side edge of a weigh platter of the scale and to a detector;
over at least a portion of the light path, routing the light beam within a light guide disposed in or along the weigh platter;
routing the light beam through a hole or window in the weigh platter;
detecting an interruption of the light beam due to an item overhanging an edge of the weigh platter.

20. A system comprising
a scanner-scale including a housing having a lower housing section and an upper housing section joined to form a generally L-shape and a weigh platter disposed in the lower section, the weigh platter being supported by at least one load cell; and
a system for reducing erroneous weighing of an item on the weigh platter of the scanner-scale, comprising
a light source disposed in or on a housing of the scanner-scale for producing a light beam;
a detector for receiving the light beam, the detector disposed in or on the housing, wherein the light beam is directed along an optical path extending (a) from the light source, (b) along a path proximate an upper side edge of the weigh platter, and (c) to the detector,
a light guide disposed in the housing and extending along and/or through the weigh platter, wherein the light guide is disposed in and provides at least a portion of the optical path for light beam between the light source and the detector,
wherein the detector is operative for detecting an interruption of the light beam due to an item encroaching upon or overhanging an edge of the weigh platter,
wherein the light source and the detector are disposed in or on the upper housing section and on a same side of the weigh platter.

* * * * *

UNITED STATES PATENT AND TRADEMARK OFFICE
CERTIFICATE OF CORRECTION

PATENT NO.         : 8,561,902 B2                                  Page 1 of 1
APPLICATION NO.    : 13/153281
DATED              : October 22, 2013
INVENTOR(S)        : Alexander M. McQueen et al.

It is certified that error appears in the above-identified patent and that said Letters Patent is hereby corrected as shown below:

In the Specification

<u>Column 2</u>
Line 43, before "one" delete "a".
Line 66, after "22" insert --is a--.

<u>Column 7</u>
Line 37, change "cell" to --cells--.

<u>Column 15</u>
Line 35, change "determined" to --determining--.

In the Claims

<u>Column 17</u>
Line 1, change "claim 1" to --claim 1, wherein--.

<u>Column 18</u>
Line 9, change "on" to --of--.
Line 40, change "alight" to --a light--.
Line 43, before "light beam" insert --the--.

Signed and Sealed this
Ninth Day of December, 2014

Michelle K. Lee
*Deputy Director of the United States Patent and Trademark Office*